(12) United States Patent
Hutton

(10) Patent No.: US 6,704,963 B1
(45) Date of Patent: Mar. 16, 2004

(54) FAILSAFE SUPPORT FOR HEIGHT ADJUSTABLE PASSENGER LOADING BRIDGES

(75) Inventor: Neil Hutton, Ottawa (CA)

(73) Assignee: DEW Engineering and Development Limited, Ottawa (CA)

( * ) Notice: Subject to any disclaimer, the term of this patent is extended or adjusted under 35 U.S.C. 154(b) by 0 days.

(21) Appl. No.: 10/292,480

(22) Filed: Nov. 13, 2002

(51) Int. Cl.[7] .............................. E01D 12/00; B66B 5/28
(52) U.S. Cl. ........................................ 14/71.5; 187/344
(58) Field of Search ............................. 187/343, 344, 187/351, 360; 14/69.5, 71.5

(56) References Cited

U.S. PATENT DOCUMENTS

| | | | | |
|---|---|---|---|---|
| 1,005,190 A | * | 10/1911 | Furlow | 91/392 |
| 1,064,203 A | * | 6/1913 | Furlow | 188/289 |
| 2,744,587 A | * | 5/1956 | Beck | 187/344 |
| 3,728,754 A | * | 4/1973 | Lodjic | 14/71.5 |
| 4,041,845 A | * | 8/1977 | Mean et al. | 92/85 A |
| 4,344,200 A | * | 8/1982 | Farr et al. | 14/71.5 |
| 4,635,907 A | * | 1/1987 | Bialy et al. | 267/221 |
| 2002/0104176 A1 | * | 8/2002 | Thomas et al. | 14/71.5 |

* cited by examiner

Primary Examiner—Thomas B. Will
Assistant Examiner—Raymond W Addie
(74) Attorney, Agent, or Firm—Freedman & Associates

(57) ABSTRACT

A failsafe support for use with a height adjustable passenger loading bridge. A main support member supports the weight of a passenger loading bridge passageway under normal operating conditions. The failsafe support includes a self-arresting mechanism for varying a length of a height-adjusting portion of the failsafe support in order to raise and lower a support portion of the failsafe support. The support portion is positionable adjacent to and spaced apart from a lower surface of the passenger loading bridge passageway, for supporting the weight of the passageway in the event of a failure of the main support member. The self-arresting mechanism prevents the passageway of the passenger loading bridge from descending to a level below the support portion.

32 Claims, 24 Drawing Sheets

FAILSAFE SUPPORT FOR HEIGHT ADJUSTABLE PASSENGER LOADING BRIDGES

FIELD OF THE INVENTION

The present invention relates generally to passenger loading bridges for transferring passengers between an aircraft and a terminal building, and more particularly to passenger loading bridges including a main elevating mechanism that is supplemented by a separate failsafe support mechanism.

BACKGROUND OF THE INVENTION

In order to make aircraft passengers comfortable, and in order to transport them between an airport terminal building and an aircraft in such a way that they are protected from the weather and from other environmental influences, passenger loading bridges are used which can be telescopically extended and the height of which is adjustable. For instance, an apron drive bridge in present day use has a plurality of adjustable modules, including: a rotunda, a telescopic tunnel, a bubble section, a cab, and elevating columns with wheel carriage. Typically. one elevating column is mounted adjacent to each lateral surface of the telescopic tunnel. Manual, semi-automated and fully-automated alignment systems are known in the art for adjusting the position of the passenger loading bridge relative to an aircraft, for instance to compensate for different sized aircraft and to compensate for imprecise parking of an aircraft at an airport terminal. Of course, other types of bridges are known in the art, such as for instance nose loader bridges, pedestal bridges and over-the-wing (OTW) bridges.

The elevating columns are used to adjust the height of an outboard end of the passenger loading bridge so that the cab engages a doorway of each different type of aircraft at a proper height. After the cab is positioned to the proper height, the elevating columns are used to support the telescopic tunnel in such a way that an approximately level surface is maintained between the doorway of the aircraft and the cab of the passenger loading bridge. For example, as aircraft are loaded and unloaded with passengers, baggage, fuel and cargo, the aircraft raises and lowers on its undercarriage causing the height of the doorway to raise and lower. It is known to provide passenger loading bridges with automatic height adjustment or autolevel mechanisms which sense the vertical movement of the aircraft and automatically adjusts the height of the cab of the passenger loading bridge accordingly. As such, the elevating columns typically are activated from time to time, while the aircraft is being loaded and unloaded, in order to compensate for such vertical movement of the aircraft.

Each elevating column typically is provided with a separate mechanism for extending and retracting the length of the elevating column. The mechanism may be electrohydraulic, as where a motor drives a pump which supplies fluid to extend or retract a hydraulic cylinder which raises or lowers the outboard end of the bridge, or may be electromechanical, as where a motor drives an electromechanical screw which raises or lowers the outboard end of the bridge. In either case, the motor is responsive to a control signal for raising and lowering the outboard end of the bridge. For instance, a first control signal operates the motor in one direction and causes the mechanism to elevate the outboard end of the passenger bridge, and a second control signal reverses the motor and causes the mechanism to lower the outboard end of the passenger bridge.

It is a disadvantage of the electrohydraulic mechanism that a ruptured check-valve or a burst hydraulic fluid line could allow hydraulic fluid to escape from the system, either slowly or rapidly, with a corresponding loss of hydraulic pressure within the hydraulic system. As a result, the passageway of the bridge would begin to descend in an uncontrolled manner. It will be obvious to one of skill in the art that the uncontrolled descent of a passenger loading bridge could result in serious injuries to persons in and about the passenger bridge. There is also the risk of serious damage occurring to service equipment that is located beneath the passenger bridge, as well as to the aircraft that is being serviced by the passenger bridge at the time of the failure. Of course, the greatest potential for damage occurs with the use of OTW bridges, wherein an uncontrolled descent of the passenger bridge could allow a portion of the bridge to make contact with a wing of the aircraft, possibly rupturing one of the aircraft's wing fuel tanks or fuel lines, thereby increasing the chance of an apron fire occurring.

Electromechanical screw mechanisms are also widely used in conjunction with the elevating columns of passenger loading bridges. Typically, the electromechanical screw mechanism is designed to operate rapidly so as to minimize the amount of time that is required to adjust the height of the passenger loading bridge for each different type of aircraft. Minimizing the amount of time that is required to adjust the height of the passenger loading bridge contributes to faster aircraft turn-around times, which provides a significant economic advantage to the airlines whose aircraft are capable of generating revenue only when they are in the air. The electromechanical screw mechanism is also designed to operate using the limited power resources that are available to each passenger loading bridge. To this end, often ball screws are employed comprising a semicircular groove machined into a "lead rod" in which ball bearings run. The bearing housing allows the balls to recirculate, which provides a very smooth and efficient drive. This means that the elevating column can operate at very high speeds and loads for long periods without damage. Unfortunately, the weight of the passenger loading bridge often is sufficient to back-drive or "wind down" the ball screw mechanism. As a result, each electromechanical screw mechanism typically includes a ball screw that is coupled to a separate heavy-duty motor. Each heavy-duty motor includes an electromagnetic brake that engages when power to the motor is cut off, for instance during a power failure or absent a signal for controlling the motor. Since the brakes are relied upon to support the entire weight of the passenger loading bridge, there is a tendency for the lifting systems of passenger loading bridges to be "over designed". For example, providing one heavy-duty motor with each electromechanical screw mechanism ensures redundancy, such that in the event that one of the heavy-duty motors fails, the remaining one will still support the entire weight of the bridge. This increases the complexity of the passenger loading bridge, resulting in increased capital costs and higher maintenance costs. Furthermore, in the event that one of the heavy-duty motors fails, there is no additional redundancy built into the system to prevent the uncontrolled descent of the passenger bridge.

Adding to the concern, there is a trend in modern passenger loading bridges to mount the 400 Hz power supply unit and the preconditioned air unit near the cab of the passenger loading bridge. These two units add approximately 10,000 pounds to the amount of weight that is being supported by the elevating columns. In the event of a failure of the elevating columns, this additional weight increases the downward force that is exerted by the passageway of the passenger loading bridge upon the elevating columns, as well as upon any objects that happen to be located beneath the passageway. If these units are added as a retrofit to the passenger loading bridge, then further modifications may also be required at that time to ensure that each one of the two heavy-duty motors is capable of supporting the combined weight of the bridge and the retrofitted units.

Of course, "safer" mechanisms are known that avoid some of the disadvantages associated with the above-mentioned mechanisms. An example of such a "safe" mechanism is an electromechanical screw mechanism including a drive screw having an acme thread. The weight of the passenger loading bridge produces a downwardly directed force that is insufficient to back-drive such a "safe" mechanism, and therefore the "safe" mechanism is effectively sel-flocking or "self-arresting". That said, the efficiency of a drive screw having an acme thread is lower, typically 30–50% depending upon nut preload, compared to that of a ball screw. Accordingly, such a "safe" mechanism operates more slowly and requires a greater amount of power compared to a typical electromechanical screw currently in use. This is especially true when the "safe" mechanism is required to raise and lower a substantial amount of weight, such as for instance the weight of a passenger loading bridge. Furthermore, the reliability and life span of a drive screw having an acme thread are reduced under high load operating conditions. Other "safe" mechanisms, such as for example a redundant ball-path screw, are subject to similar limitations. Accordingly, it is very difficult to implement an elevating column of a passenger loading bridge that includes a "safe" mechanism. In fact, the use of a "safe" mechanism is practical only when the mechanism is not required to raise or lower a substantial amount of weight. Of course, this critical condition is not satisfied in the prior art lift systems since the elevating columns usually bear a substantial portion of the weight of the passenger loading bridge under normal operating conditions.

It would be advantageous to provide a back-up mechanism that is separate from the main elevating columns, for supporting a passenger loading bridge in the event of a failure of the main lift system.

Object and Summary of the Invention

In order to overcome these and other limitations of the prior art, it is an object of the instant invention to provide a failsafe support for supporting a passenger loading bridge in the event of a failure of a main support.

In accordance with an aspect of the instant invention there is provided a failsafe support for a passenger loading bridge having a passageway that is supported in a height-adjustable manner by a main support including at least a height-adjustable support post, the failsafe support comprising: a support portion for being positioned adjacent to a lower surface of a passenger loading bridge passageway in a first operating condition and for engaging the lower surface of the passenger loading bridge passageway in a second operating condition; a height-adjusting portion extending from the support portion to a mounting end, the mounting end for being mounted to the main support; and, a self-arresting mechanism for varying at least one of a length of the height-adjusting portion and an orientation of the height-adjusting portion in the first operating condition and for maintaining approximately constant the at least one of a length of the height-adjusting portion and an orientation of the height-adjusting portion in the second operating condition, wherein the failsafe support supports a weight that is significantly less than an entire weight of the passenger loading bridge passageway when in the first operating condition, and wherein the failsafe support bears a substantial portion of the weight of the passenger loading bridge passageway when in the second operating condition.

In accordance with another aspect of the instant invention there is provided an apparatus for supporting a passageway of a passenger loading bridge in a height-adjustable manner, comprising: a main support, including: a wheeled frame; and, a lift mechanism having a first end and a second end opposite the first end, the lift mechanism mounted to the wheeled frame at the first end and mounted to a passageway of a passenger loading bridge at the second end, for supporting the passageway of the passenger loading bridge in a height adjustable manner; and, a failsafe support having a support end and a height-adjusting end, the failsafe support mounted at the height-adjusting end to the wheeled frame of the main support such that, in use, the support end is positionable adjacent to a lower surface of the passageway of the passenger loading bridge being supported by the lift mechanism of the main support, wherein the failsafe support maintains the passageway of the passenger loading bridge at approximately a height of the support end in the event of a failure of the lift mechanism of the main support.

In accordance with yet another aspect of the instant invention there is provided a kit for retrofitting a passenger loading bridge equipped with a main support member including at least a height-adjustable lift mechanism, the kit comprising: a failsafe support member having a mounting portion adapted to be mounted to a frame of a main support member and a support portion for supporting the passenger loading bridge, the failsafe support member including a self-arresting mechanism for varying a distance between the mounting portion and the support portion; and, a motor for providing to the self-arresting mechanism a sufficient amount of power for varying the distance between the mounting portion and the support portion when the failsafe support is other than supporting a weight of the passenger loading bridge.

BRIEF DESCRIPTION OF THE DRAWINGS

Exemplary embodiments of the invention will now be described in conjunction with the following drawings, in which similar reference numbers designate similar items:

FIG. 1b is a partial cross-sectional view of the at least a height adjustable support post of FIG. 1a;

DETAILED DESCRIPTION OF THE INVENTION

The following description is presented to enable a person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and the scope of the invention. Thus, the present invention is not intended to be limited to the embodiments disclosed, but is to be accorded the widest scope consistent with the principles and features disclosed herein. In particular, the instant invention may be used in conjunction with a wide variety of passenger loading bridge types, including but not limited to, apron drive bridges, over-the-wing (OTW) bridges and radial drive bridges.

Figure 1A:
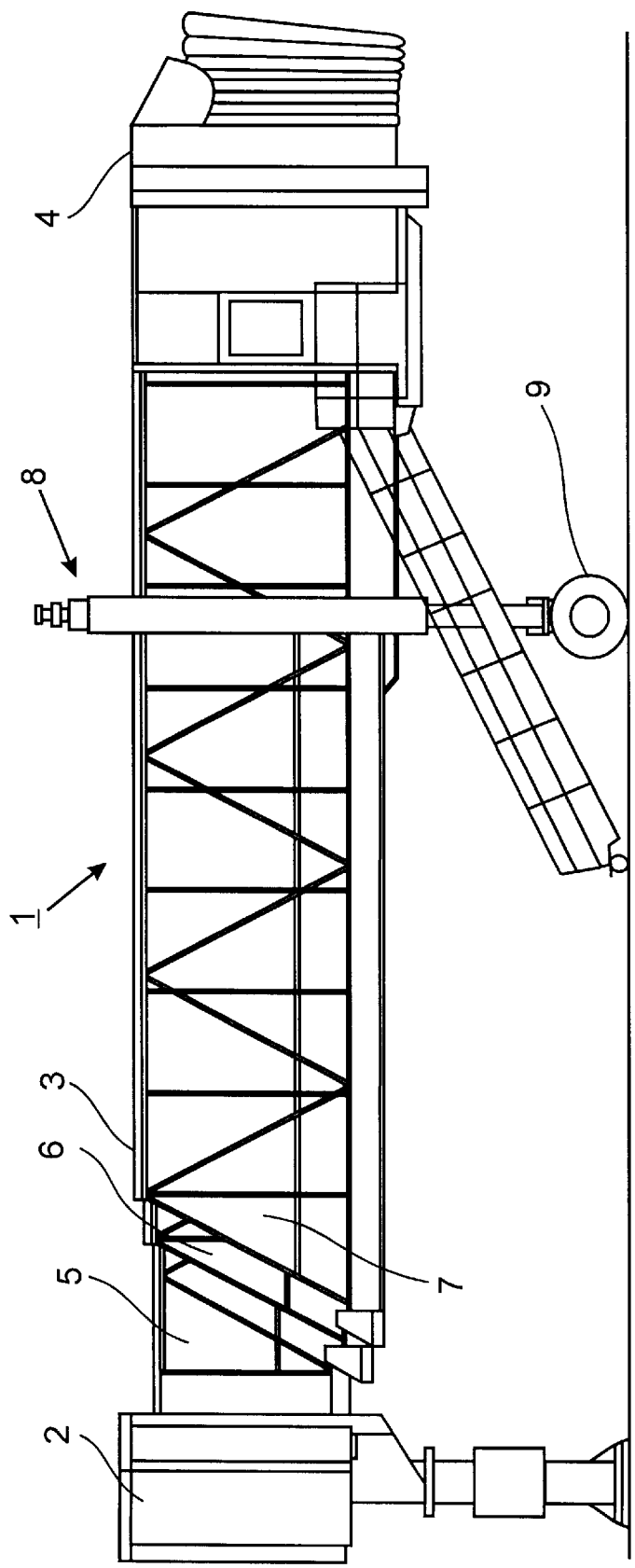
FIG. 1a is a side elevational view of a passenger loading bridge according to the prior art.

Referring to FIG. 1a, shown is a side elevational view of a passenger loading bridge according to the prior art. The passenger loading bridge 1 includes a stationary rotunda 2 from which extends a telescopic passageway 3 ending with a pivotal cabin 4 for mating to a doorway of a not illustrated aircraft. The telescopic passageway 3 includes a first tunnel element 5, which is telescopically received within a second tunnel element 6, which in turn is telescopically received within a third tunnel element 7, such that the length of the telescopic passageway 3 is variable. The telescopic passageway 3 is supported near an outboard end thereof by a wheel carriage including at least a height adjustable support post 8 and ground engaging drive wheels 9. The drive wheels 9 are for achieving angular displacement of the passageway 1.

Figure 1B:
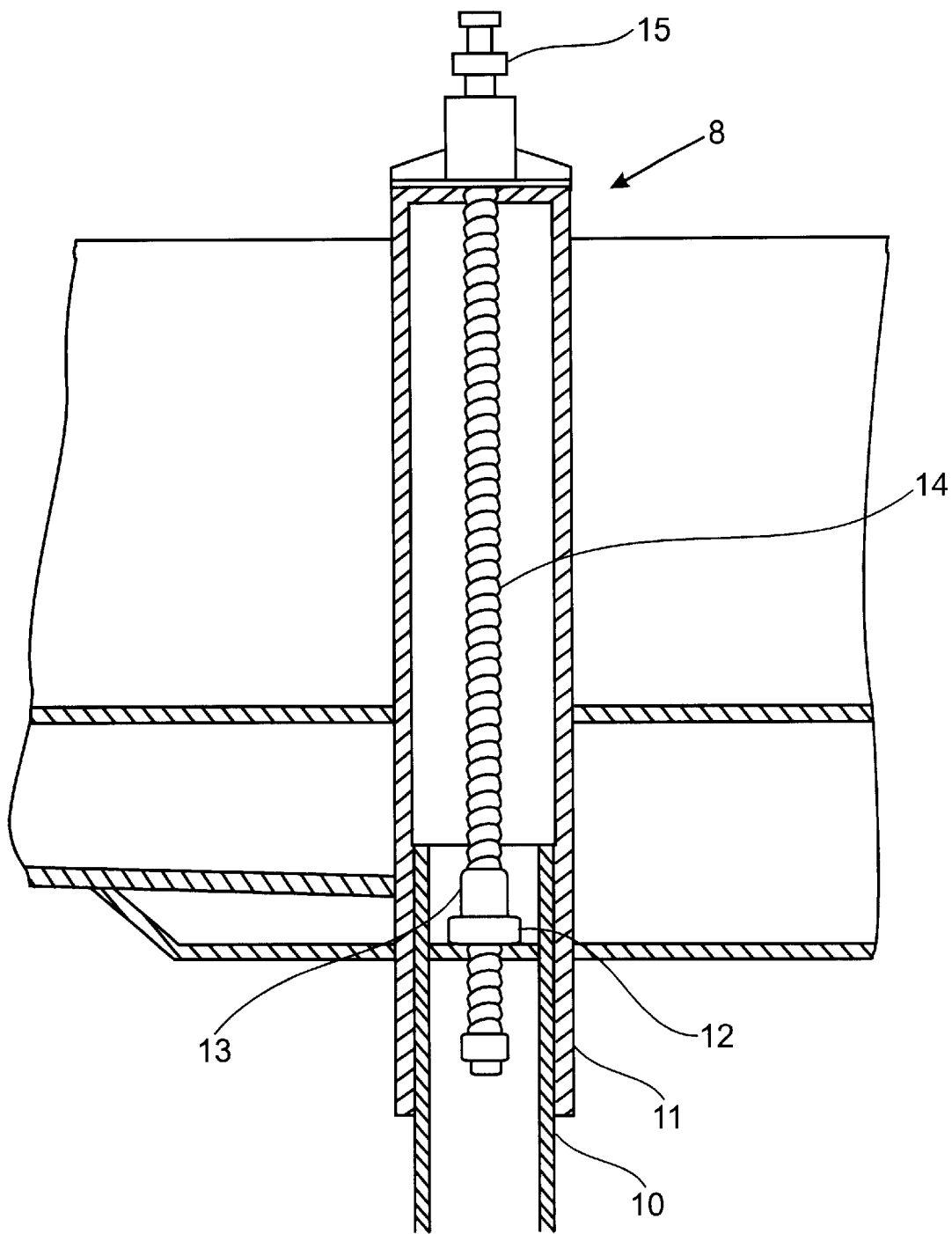

Referring now to FIG. 1b, shown is a partial cross-sectional view of the at least a height adjustable support post 8 of FIG. 1a. In particular, FIG. 1b shows a detailed view of the at least a height adjustable support post 8. The at least a height adjustable support post 8 includes an inner hollow sleeve 10 that is telescopically received within an outer hollow sleeve 11 such that the length of the at least a height adjustable support post 8 is variable. A mounting plate 12 is fixedly mounted within the inner hollow sleeve 10 for supporting a ball nut 11. The ball nut 11 retains a drive screw 14, one end of which is disposed within the inner hollow sleeve 10 below the mounting plate 12, and the other end of which is coupled to a reversible motor 15 that is located above the telescopic passageway 3. Operating the reversible motor 15 in one direction causes the drive screw 14 to turn in a first direction for raising the telescopic passageway 3, whereas operating the reversible motor 15 in the opposite direction causes the drive screw 14 to turn in a second direction for lowering the telescopic passageway 3.

Figure 2A:
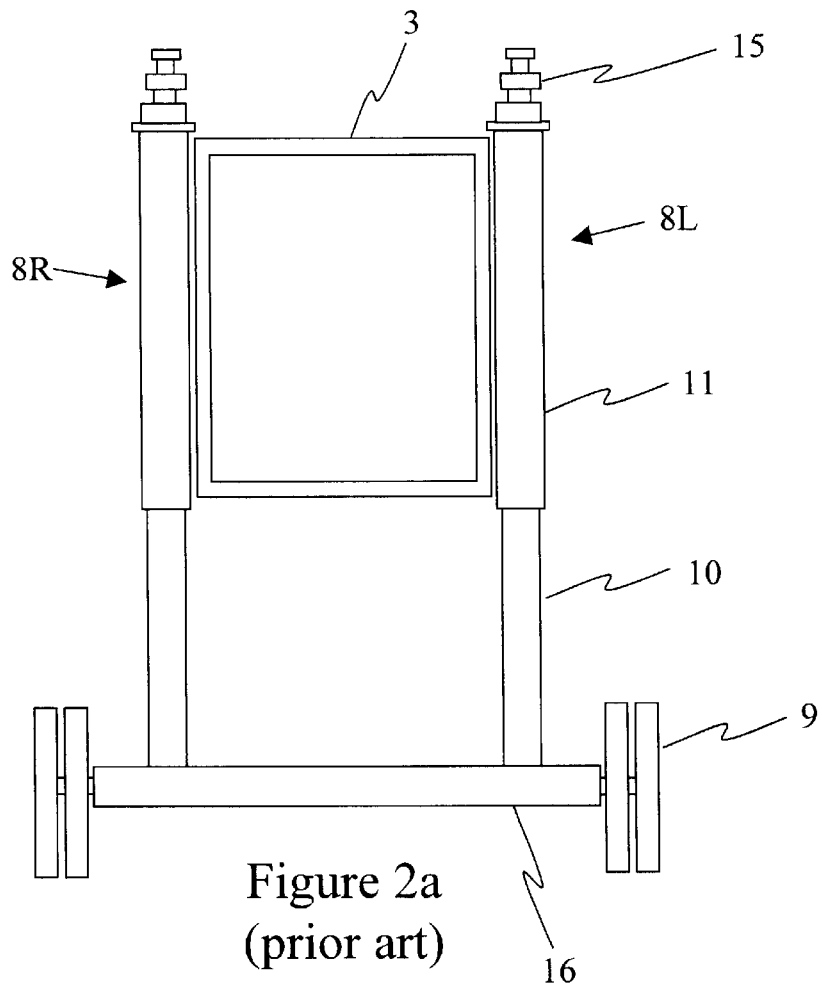
FIG. 2a is an end view of the passenger loading bridge of FIG. 1a with the passageway in a raised condition.
Figure 2B:
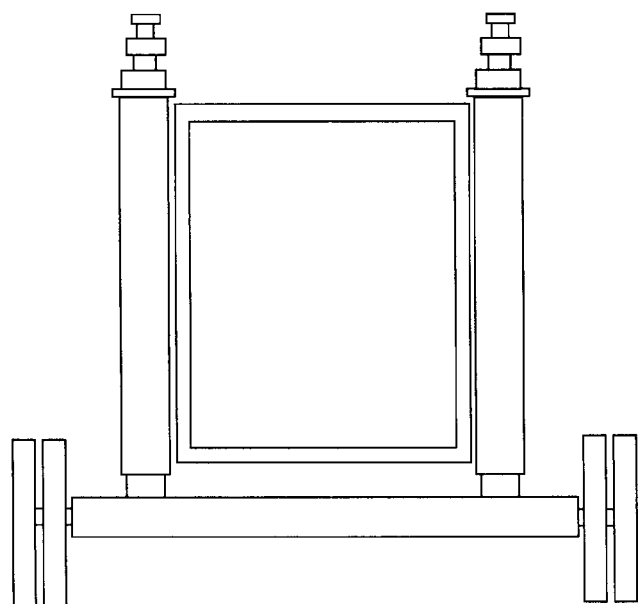
FIG. 2b is an end view of the passenger loading bridge of FIG. 1a with the passageway in a lowered condition.

Referring now to FIG. 2a, shown is an end view of a passenger loading bridge of FIG. 1a. The telescopic passageway 3 is supported by height adjustable support posts 8R and 8L, which are disposed adjacent to the right and left lateral surfaces of the telescopic passageway 3, respectively. Each height adjustable support post 8R and 8L includes inner and outer hollow sleeves 10 and 11, respectively. The wheel carriage further includes a cross-member 16 to which the drive wheels 9 are mounted. The support posts 8R, 8L are mounted one each at opposite ends of the cross member 16. As will be evident to one of skill in the art, a failure of the support posts 8R, 8L allows the outer sleeve 11 to move in a downward direction until the support post "bottoms out", as is shown in FIG. 2b. Accordingly, the telescopic passageway of the prior art passenger loading bridge is able to descend to a height that is unsafe in the event of a failure of the support posts 8R, 8L.

Figure 3A:
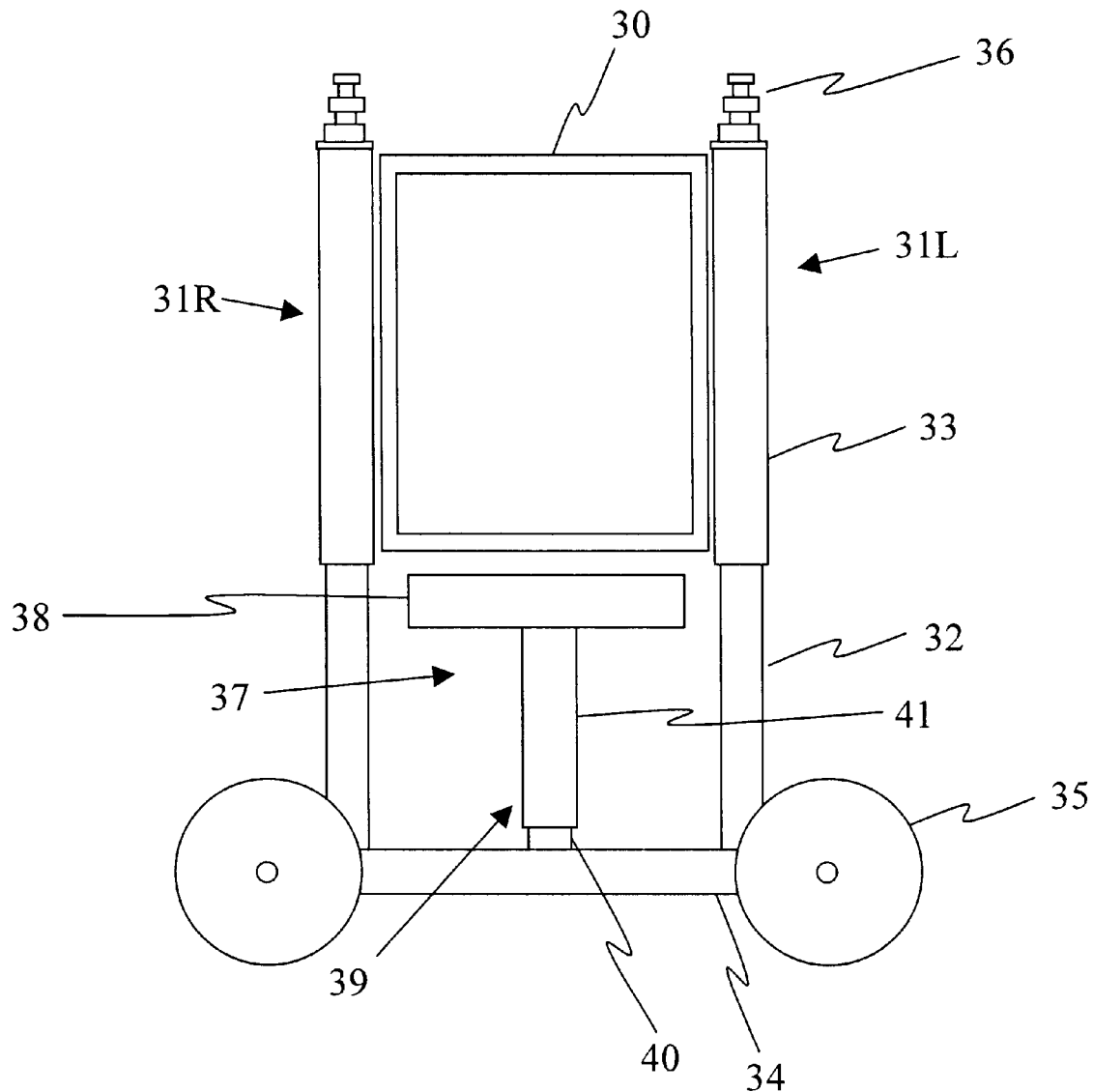
FIG. 3a is an end view of a passenger loading bridge including a failsafe support according to a first embodiment of the instant invention, showing the passageway in a lowered condition and the fail-safe support in a lowered condition.

Referring now to FIG. 3a, shown is an end view of a passenger loading bridge including a failsafe support according to a first embodiment of the instant invention. A passageway 30 is supported in a height adjustable manner by a main support including height adjustable support posts 31R, 31L, which are mounted to the right and left lateral surface of the passageway 30, respectively. For example, each height adjustable support post 31R, 31L of the main support includes inner and outer hollow sleeves 32 and 33, respectively. The two height adjustable support posts 31R, 31L are mounted, one each near opposite ends of a cross-member 34 of a wheel carriage to which the drive wheels 35 are also mounted. For example, the passenger loading bridge of FIG. 3a is a radial drive bridge, having the drive wheels 35 directed approximately normal to the longitudinal axis of the passageway 30. Accordingly, the outboard end of the passageway 30 is moveable along an arcuate path. Optionally, the passageway 30 includes a telescopic portion (not shown) that is mounted at an outboard end of the passageway 30 for being extended over the wing of an aircraft in a cantilever-like manner. Further optionally, the passageway 30 is a telescopic passageway of an apron drive bridge, in which case the drive wheels are steerable.

Each support post 31R, 31L includes a mechanism (not shown) for varying the length of the support post 31R, 31L. For example, the mechanism is an electromechanical mechanism of a type that is well known in the art, such as for instance a ball screw mechanism. A separate reversible electric motor 36 is coupled to the mechanism of each support post 31R, 31L, for actuating the mechanism in order to vary the length of the support post 31R, 31L. Preferably, each one of the separate reversible electric motors 36 is mounted at a location that is above the passageway 30. Optionally, the mechanism is an electrohydraulic mechanism.

Referring still to FIG. 3a, a failsafe support according to a first embodiment of the instant invention is shown mounted via a mounting end to the cross-member 34 at a point that is approximately intermediate the two support posts 31R, 31L. The failsafe support according to the first embodiment, which is shown generally at 37, includes a height-adjusting portion in the form of a telescoping support post 39 for raising and lowering a support portion 38 The telescoping support post 39 includes a first portion 40 that is telescopically received within a second portion 41, such that the length of the support post 39 is variable. The failsafe support 37 further includes a mechanism (not shown) for adjusting the length of the support post 39. The mechanism (not shown) is a self-arresting mechanism, which is capable of "arresting" the failsafe support 37 at a current position in the event of a failure of the support posts 31R, 31L. For example, the mechanism (not shown) is one of a redundant ball-path screw and a ball screw having an acme thread. The mechanism (not shown) is coupled to the output of a not illustrated reversible electric motor. Advantageously, the self-arresting functionality is an inherent property of the mechanism itself, and is not a result of the braking action of an electric motor. As such, an electric motor that is light weight, relative to the electric motors 36, is suitable for raising and lowering the failsafe support, since the motor is not required to support the entire weight of the passageway 30. Optionally, a type of self-arresting mechanism other than one of the above-mentioned examples is used.

Figure 3B:
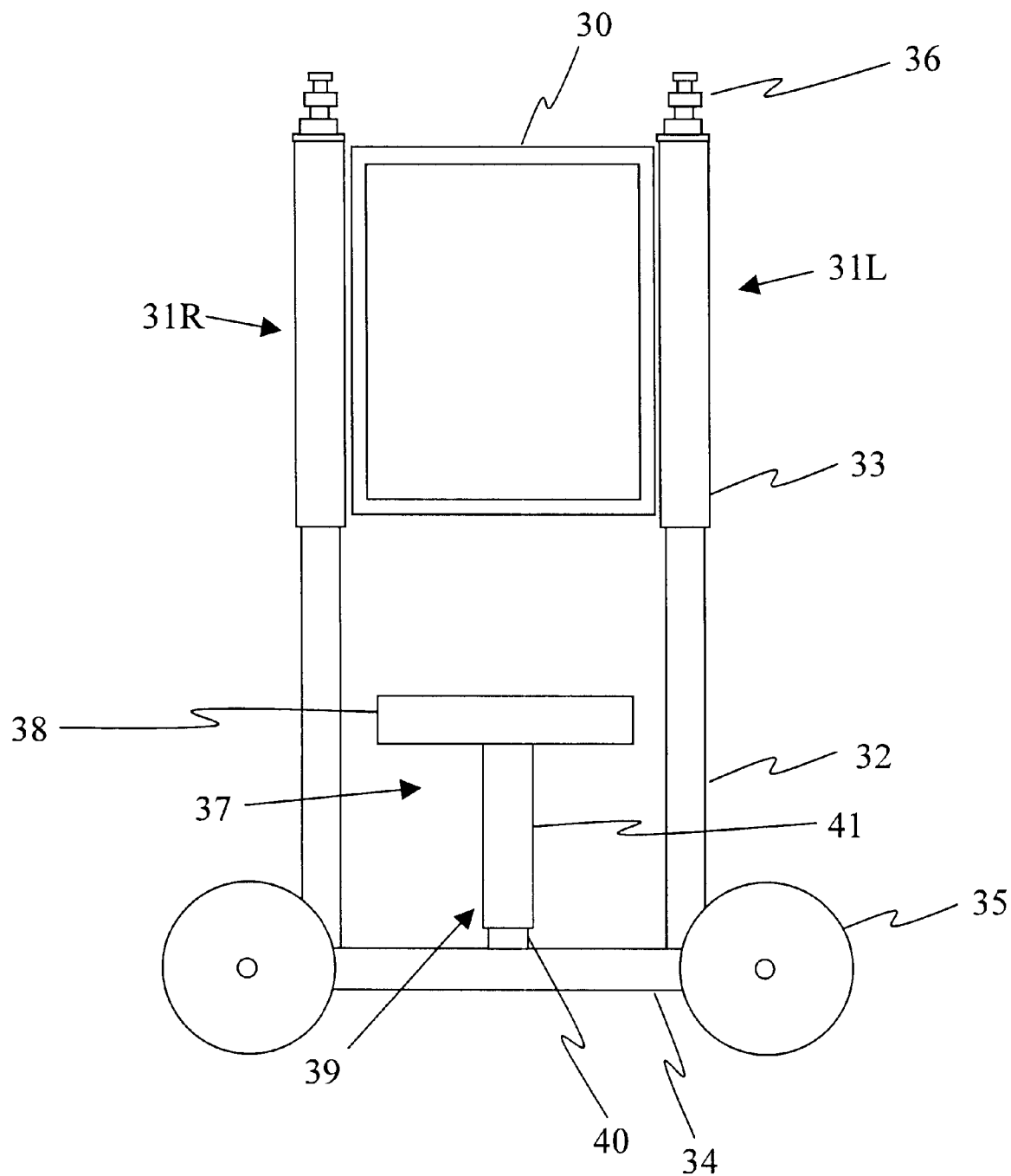
FIG. 3b is an end view of the passenger loading bridge shown in FIG. 3a, but with the passageway in a raised condition and with the fail-safe support in a lowered condition.

Referring now to FIG. 3b, shown is an end view of the passenger loading bridge of FIG. 3a, but with the passageway in a raised condition and with the fail-safe support in a lowered condition. For example, FIG. 3b illustrates a situation in which the passageway 30 is in the process of being aligned with a doorway of an aircraft. In particular, the mechanism for varying the length of the support posts 31R, 31L operates more quickly than the mechanism for varying the length of the telescoping support post 39. This is the case when, for instance, the mechanism for varying the length of the support posts 31R, 31L includes a screw having a light-duty thread requiring fewer turns to advance compared to the mechanism for varying the length of the telescoping support post 39. Since it is desirable economically to minimize aircraft turnaround times, there is a significant advantage to providing support posts 31R, 31L that may be rapidly extended or retracted to a desired length. Alternatively, the passageway is adjusted to a desired height for engaging the aircraft, prior to the failsafe support 37 being moved into a raised condition. Maintaining the failsafe support 37 in the lowered condition until after the aircraft is engaged reduces the risk of contact occurring between the passageway 30 and the support portion 38 while the passageway 30 is being adjusted.

Optionally, the passageway 30 and the failsafe support 37 are adjusted during a same overlapping period of time, with the failsafe support 37 maintaining approximately a predetermined minimum clearance between an upper surface of the support portion 38 and a lower surface of the passageway 30. Further optionally, the rate at which the passageway 30 is being adjusted is reduced when the clearance between the upper surface of the support portion 38 and the lower surface of the passageway 30 exceeds a predetermined maximum value.

Figure 3C:
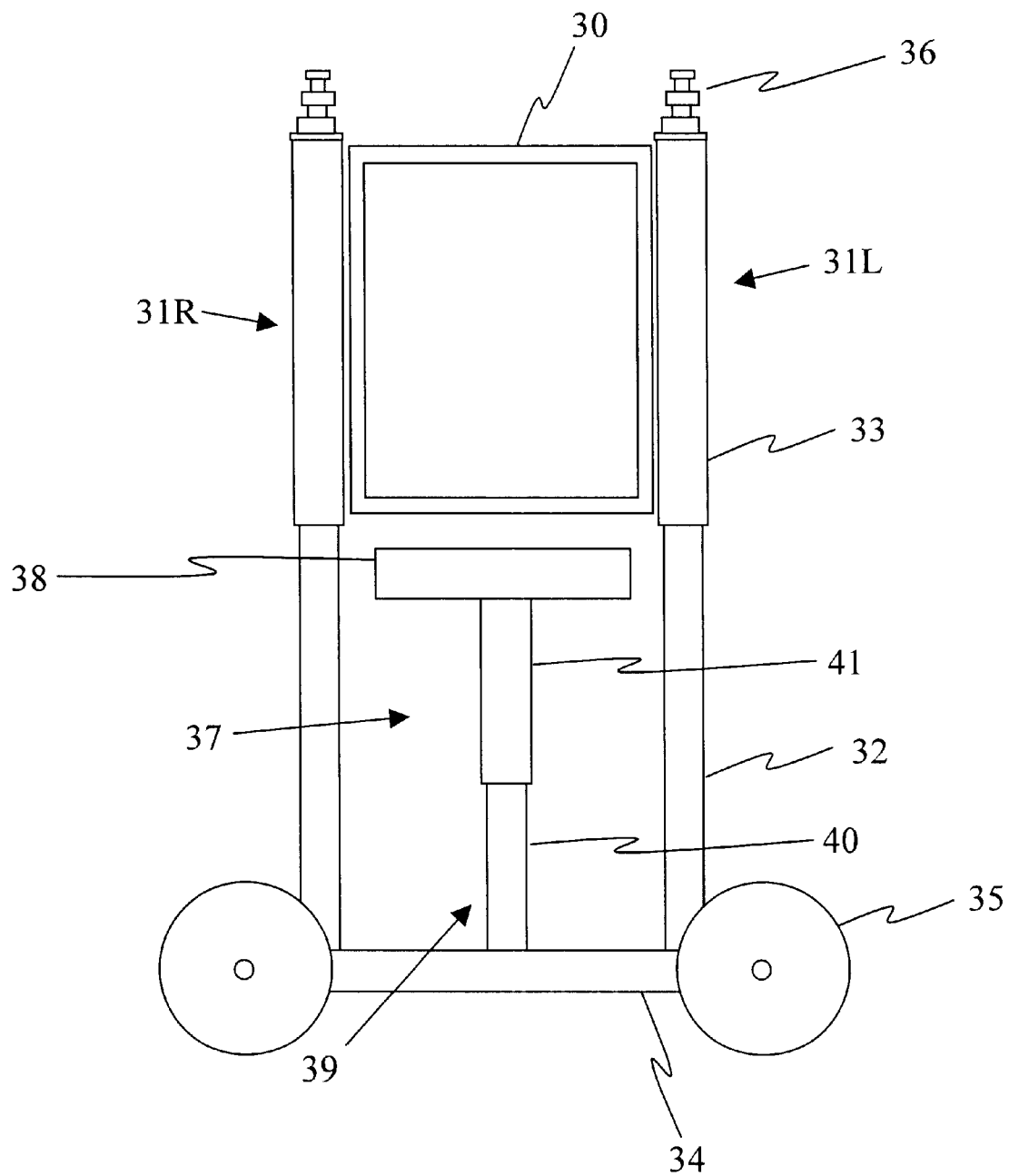
FIG. 3c is an end view of the passenger loading bridge shown in FIG. 3a, but with the passageway in a raised condition and with the fail-safe support in a raised condition.

Referring now to FIG. 3c, shown is an end view of the passenger loading bridge of FIG. 3a, but with the passageway 30 in a raised condition and with the fail-safe support 37 in a raised condition. For instance, the passageway 30 is being supported for servicing an aircraft. In this case, the support posts 31R, 31L bear the entire weight of the passageway 30, and the support portion 38 of the failsafe support 37 is disposed a desired distance below the passageway 30, but preferably does not make contact therewith. As such, the support portion 38 of the failsafe support 37 other than supports the weight of the passageway 30 during normal operation. Advantageously, maintaining a clearance between the support portion and the passageway supports operation of the autoleveling system.

Optionally, the support portion 38 of the failsafe support is brought into contact with the passageway 30, such that the failsafe support 38 bears the entire weight of the passageway 30 while the aircraft is being serviced. In this optional case, the failsafe support 37 is preferably in communication with the autoleveling system, such that the height of the failsafe support 37 is adjusted by a corresponding amount whenever the height of the passageway 30 is changed. Further optionally, the failsafe support 37 bears less than the entire weight of the passageway 30, the balance of the weight of the passageway 30 being borne by the support posts 31R, 31L.

Figure 3D:
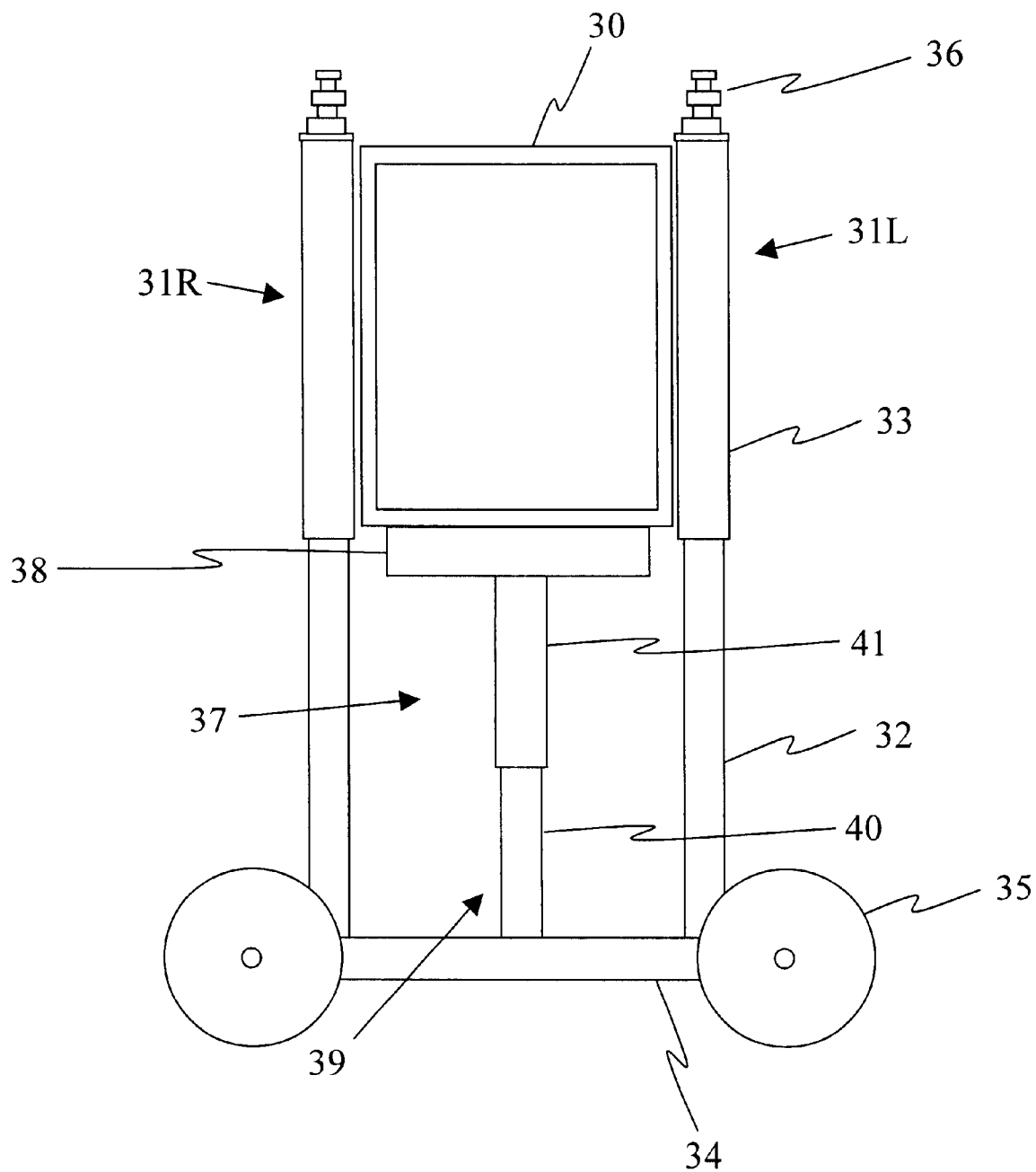
FIG. 3d is an end view of the passenger loading bridge shown in FIG. 3a, but with the passageway being supported by the fail-safe support.

FIG. 3d is an end view of the passenger loading bridge shown in FIG. 3a, but with the passageway being supported by the failsafe support. For example, a failure has occurred involving the support posts 31R, 31L, and the passageway 30 has descended part way, coming to rest on the support portion 38 of the failsafe support 37. In this condition, the self-arresting mechanism of the failsafe support 37 is supporting the entire weight of the passageway 30, preventing the passageway from descending further. For example, it is not the motor that is braking to prevent the mechanism from "winding down". Optionally, the support portion has disposed along its upper surface a cushioning material for absorbing shock when the passageway comes to rest on the support portion 38.

Figure 4A:
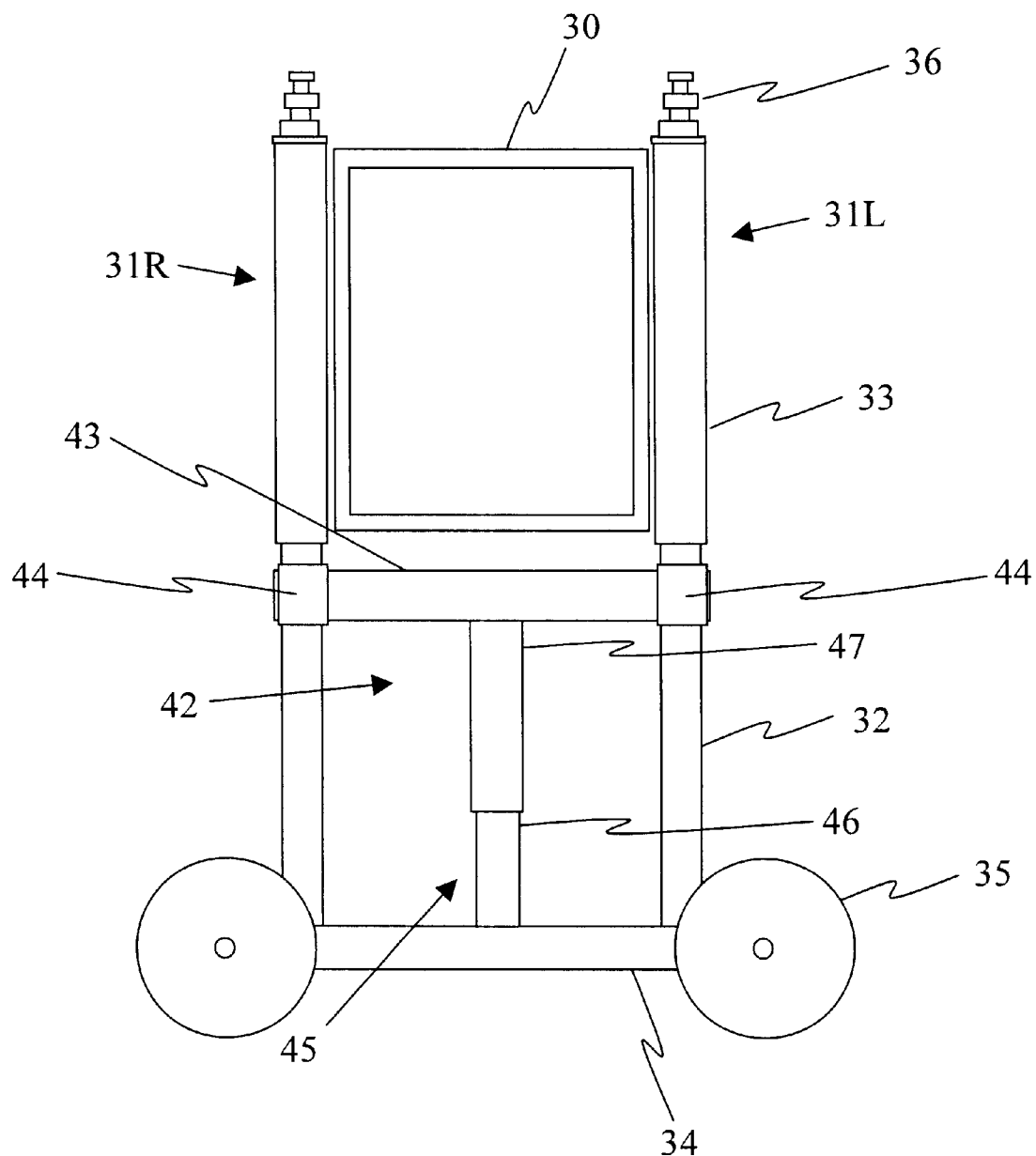
FIG. 4a is an end view of a passenger loading bridge including a failsafe support according to a second embodiment of the instant invention, showing the passageway in a raised condition and with the fail-safe support in a raised condition.

Referring now to FIG. 4a, shown is an end view of a passenger loading bridge including a failsafe support according to a second embodiment of the instant invention. In FIG. 4a, the passageway is illustrated in a raised condition and the failsafe support is illustrated in a raised condition. A passageway 30 is supported in a height adjustable manner by a main support including height adjustable support posts 31R, 31L mounted to the right and left lateral surface of the passageway 30, respectively. For example, each height adjustable support post 31R, 31L of the main support includes inner and outer hollow sleeves 32 and 33, respectively. The two height adjustable support posts 31R, 31L are mounted, one each near opposite ends of a cross-member 34 of a wheel carriage to which the drive wheels 35 are also mounted. For example, the passenger loading bridge of FIG. 4a is a radial drive bridge, having the drive wheels 35 directed approximately normal to the longitudinal axis of the passageway 30. Accordingly, the outboard end of the passageway 30 is moveable along an arcuate path. Optionally, the passageway 30 includes a telescopic portion (not shown) that is mounted at an outboard end-of the passageway 30 for being extended over the wing of an aircraft in a cantilever-like manner. Further optionally, the passageway 30 is a telescopic passageway of an apron drive bridge, in which case the drive wheels are steerable.

Each support post 31 includes a mechanism (not shown) for varying the length of the support post 31R, 31L. For example, the mechanism is an electromechanical mechanism of a type that is well known in the art, such as for instance a ball screw mechanism. A separate reversible electric motor 36 is coupled to the mechanism of each support post 31R, 31L, for actuating the mechanism in order to vary the length of the support post 31R, 31L. Preferably, each one of the separate reversible electric motors 36 is mounted at a location that is above the passageway 30. Optionally, the mechanism is an electrohydraulic mechanism.

Referring still to FIG. 4a, a failsafe support according to a second embodiment of the instant invention is shown mounted via a mounting end to the cross-member 34 at a point that is approximately intermediate the two support posts 31R, 31L. The failsafe support according to a second embodiment, shown generally at 42, includes a height-adjusting portion in the form of a telescoping support post 45 for raising and lowering a support portion 43. The support portion 43 includes two collars 44, one collar 44 being mounted at each opposite end of the support portion. Each collar 44 slidingly engages one of the support post 31R, 31L inner sleeves 32. The telescoping support post 45 includes a first portion 46 that is telescopically received within a second portion 47, such that the length of the support post 45 is variable. When the length of the support post 45 is changed, the collars 44 slide along the support post 31R, 31L inner sleeves 32, which guides the support portion 43. The failsafe support 42 further includes a mechanism (not shown) for adjusting the length of the support post 45. The mechanism (not shown) is a self-arresting mechanism, which is capable of "arresting" the failsafe support 42 at a current position in the event of a failure of the support posts 31R, 31L. For example, the mechanism (not shown) is one of a redundant ball-path screw and a ball screw having an acme thread. The mechanism (not shown) is coupled to the output of a not illustrated reversible electric motor. Advantageously, the self-arresting functionality is an inherent property of the mechanism itself, and is not a result of the braking action of an electric motor. As such, an electric motor that is light weight, relative to the electric motors 36, is suitable for raising and lowering the failsafe support, since the motor is not required to support the entire weight of the passageway 30. Optionally, a type of self-arresting mechanism other than one of the above-mentioned examples is used.

Figure 4B:
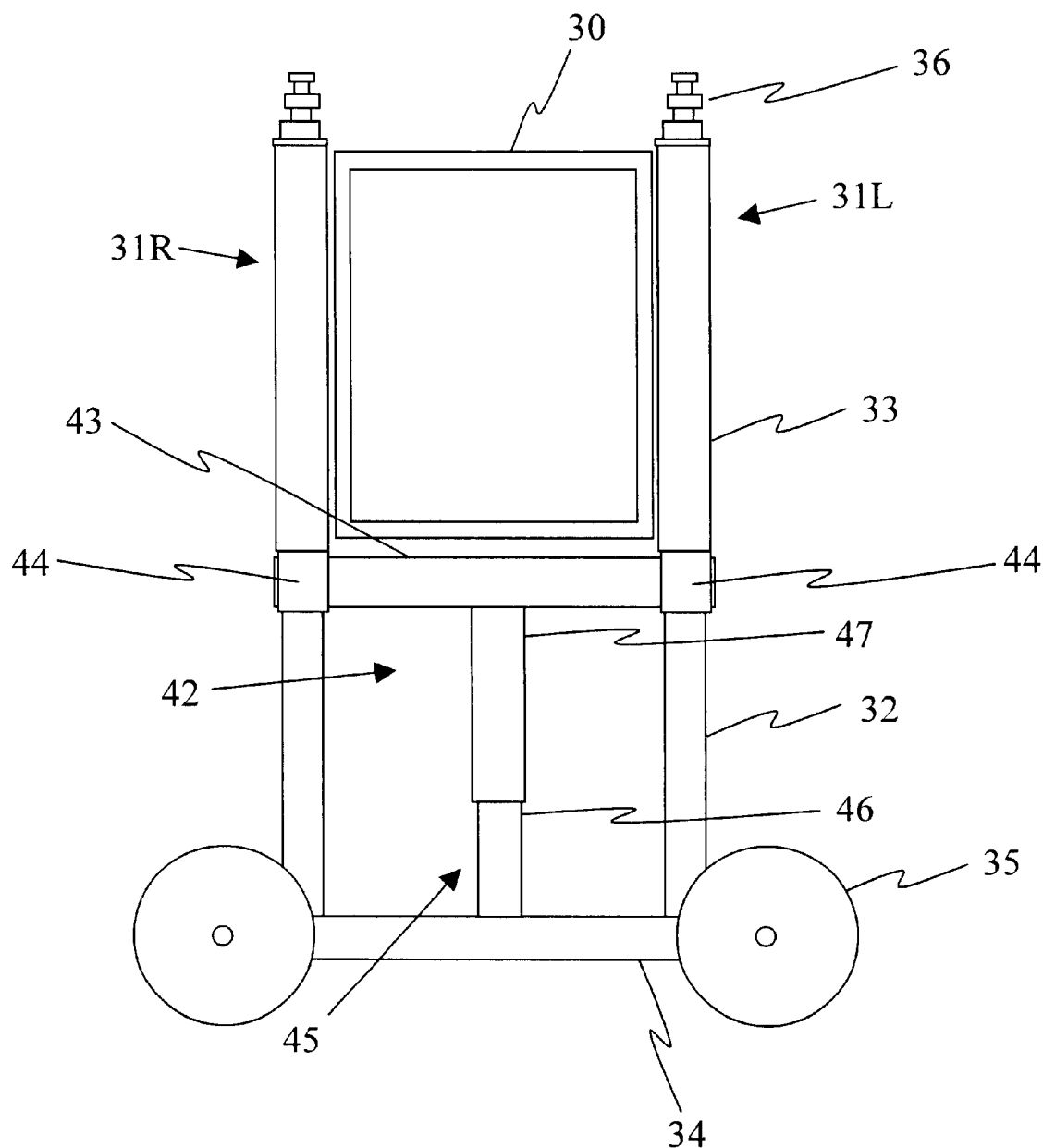
FIG. 4b is an end view of the passenger loading bridge shown in FIG. 4a, but with the passageway being supported by the fail-safe support.

Referring now to FIG. 4b, shown is an end view of the passenger loading bridge of FIG. 4a, but with the passageway being supported by the fail-safe support. For example, a failure has occurred involving the support posts 31R, 31L, and the passageway 30 has descended part way, coming to rest on the failsafe support 42. In particular, the collars 44 mounted at opposite ends of the support portion 43 have engaged the outer sleeve 33 of the support post 31R, 31L. In the condition that is illustrated in FIG. 4b the self-arresting mechanism of the failsafe support 42 is supporting the entire weight of the passageway 30, preventing the passageway from descending further. For example, it is not the motor that is braking to prevent the mechanism from "winding down". Optionally, the bottom end of the outer sleeve 33 is fitted with an outwardly projecting flange for engaging the collar 44. Further optionally, the bottom end of the outer sleeve 33 is fitted with a resilient material for absorbing shock.

Figure 4C:
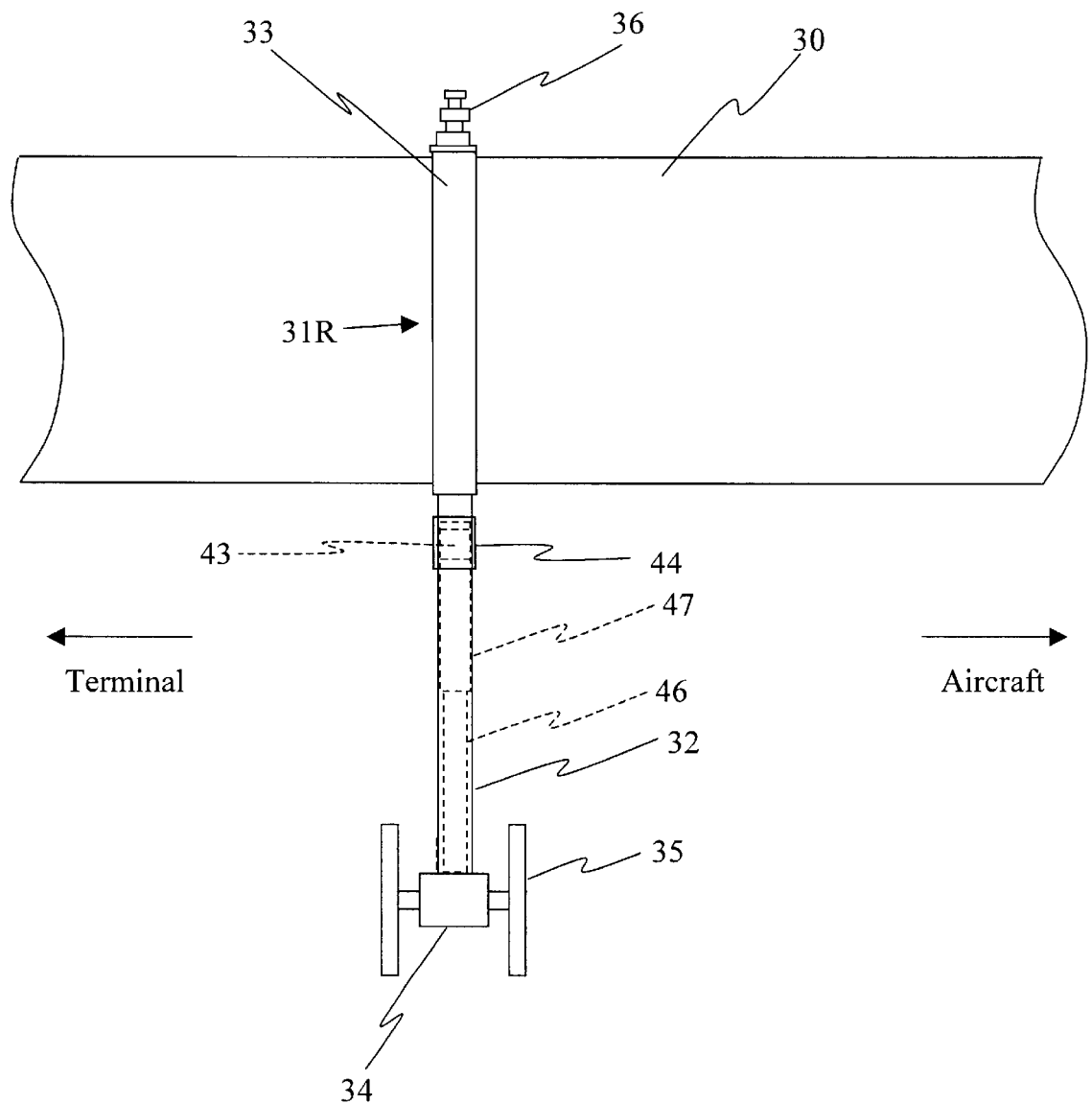
FIG. 4c is a partial side-elevational view of the passenger loading bridge shown in FIG. 4a, with the passageway in a raised condition and with the fail-safe support in a raised condition.

Referring now to FIG. 4c, shown is a partial side-elevational view of the passenger loading bridge of FIG. 4a, with the passageway in a raised condition and with the fail-safe support in a raised condition.

Figure 5A:
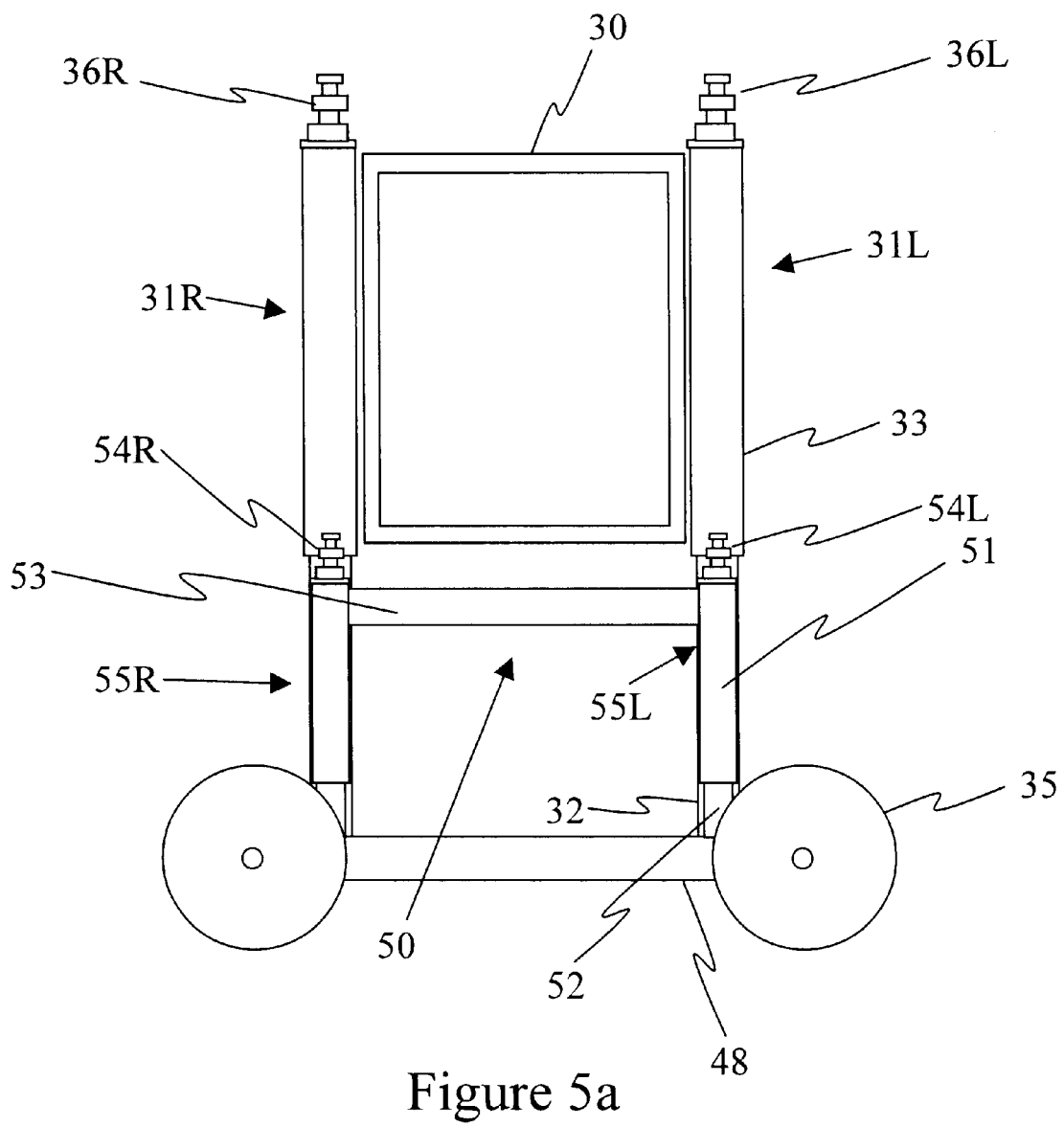
FIG. 5a is an end view of a passenger loading bridge including a failsafe support according to a third embodiment of the instant invention, showing the passageway in a lowered condition and the fail-safe support in a lowered condition.

Referring now to FIG. 5a, shown is an end view of a passenger loading bridge including a failsafe support according to a third embodiment of the instant invention. A passageway 30 is supported in a height adjustable manner by a main support including height adjustable support posts 31R, 31L mounted to the right and left lateral surface of the passageway 30, respectively. For example, each height adjustable support post 31R, 31L of the main support includes inner and outer hollow sleeves 32 and 33, respectively. The two height adjustable support posts 31R, 31L are mounted, one each near opposite ends of a cross-member 48 of a wheel carriage to which the drive wheels 35 are also mounted. For example, the passenger loading bridge of FIG. 5a is a radial drive bridge, having the drive wheels 35 directed approximately normal to the longitudinal axis of the passageway 30. Accordingly, the outboard end of the passageway 30 is moveable along an arcuate path. Optionally, the passageway 30 includes a telescopic portion (not shown) that is mounted at an outboard end of the passageway 30 for being extended over the wing of an aircraft in a cantilever-like manner. Further optionally, the passageway 30 is a telescopic passageway of an apron drive bridge, in which case the drive wheels are steerable.

Each support post 31R, 31L includes a mechanism (not shown) for varying the length of the support post 31R, 31L. For example, the mechanism is an electromechanical mechanism of a type that is well known in the art, such as for instance a ball screw mechanism. A separate reversible electric motor 36R, 36L is coupled to the mechanism of each support post 31R, 31L, for actuating the mechanism in order to vary the length of the support post 31R, 31L. Preferably, each one of the separate reversible electric motors 36R, 36L is mounted at a location that is above the passageway 30. Optionally, the mechanism is an electrohydraulic mechanism.

Referring still to FIG. 5a, a failsafe support according to a third embodiment of the instant invention is shown mounted via a mounting end to the cross-member 48. The failsafe support according to the third embodiment, shown generally at 50, includes a height-adjusting portion in the form of two telescoping support posts 55R, 55L mounted one each near opposite ends of the cross-member 48. The two telescoping support posts 55R, 55L are separated by a distance that is substantially identical to the separation between the two support posts 31R, 31L. Each telescoping support post 55R, 55L includes a first portion 52 that is telescopically received within a second portion 51, such that the length of the support post 55R, 55L is variable. The support posts 55R, 55L support therebetween a support portion 53. Furthermore, each support post 55R, 55L includes a mechanism (not shown) for adjusting the length of the support post 55R, 55L. The mechanism (not shown) is a self-arresting mechanism, which is capable of "arresting" the failsafe support 50 at a current position in the event of a failure of the support posts 31R, 31L. For example, the mechanism (not shown) is one of a redundant ball-path screw and a ball screw having an acme thread. The mechanism (not shown) of the support post 55R is coupled to the output of a reversible electric motor 54R, and the mechanism (not shown) of the support post 55L is coupled to the output of a reversible electric motor 54L. Advantageously, the self-arresting functionality is an inherent property of the mechanism itself, and is not a result of the braking action of the electric motors 54R, 54L. As such, the electric motors 54R, 54L may have a-lighter-duty rating compared to the electric motors 36R, 36L, since the motors are not required to support the entire weight of the passageway 30. Optionally, a type of self-arresting mechanism other than one of the above-mentioned examples is used.

Figure 5B:
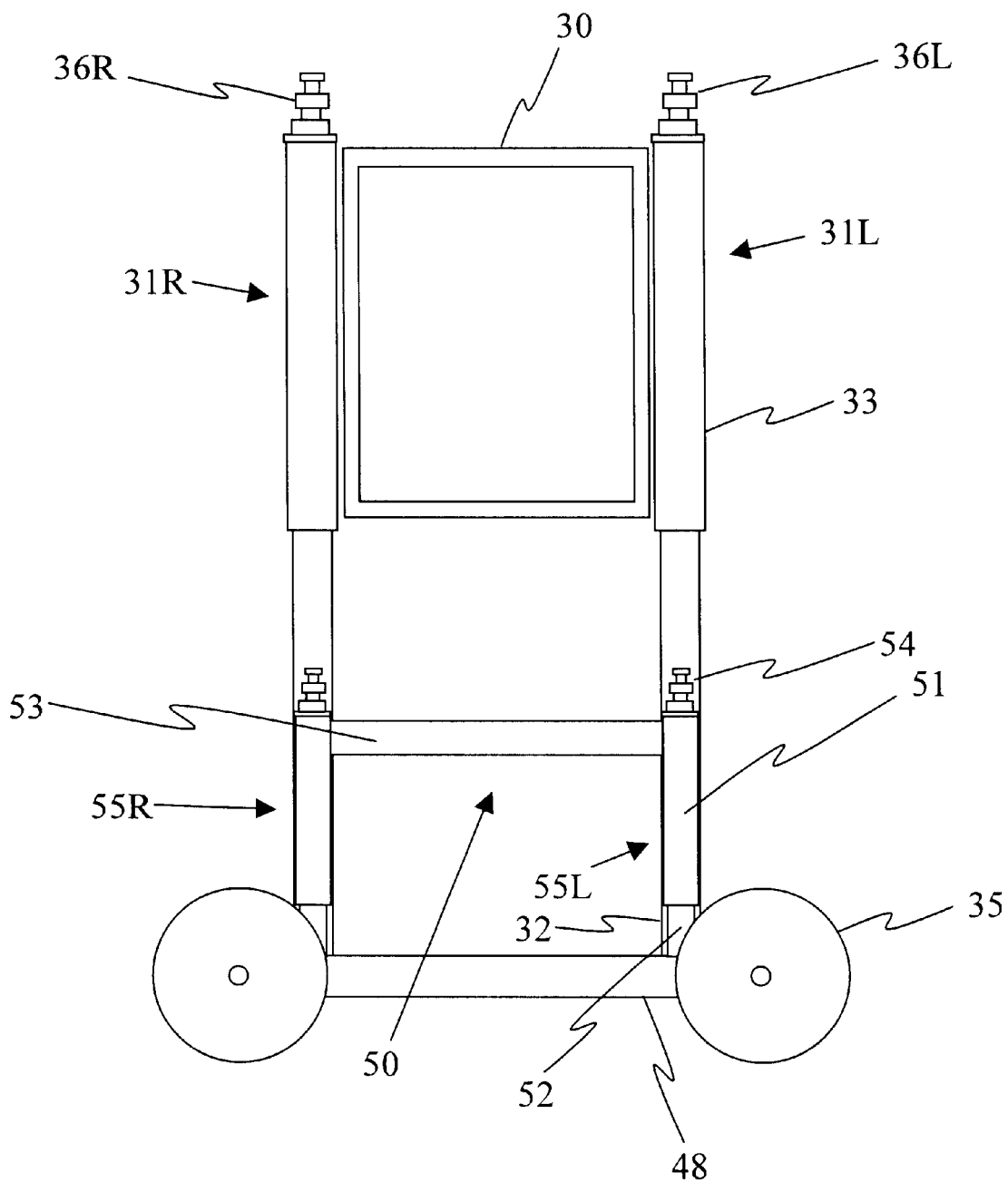
FIG. 5b is an end view of the passenger loading bridge shown in FIG. 5a, but with the passageway in a raised condition and with the fail-safe support in a lowered condition.

Referring now to FIG. 5b, shown is an end view of the passenger loading bridge of FIG. 5a, but with the passageway in a raised condition and with the fail-safe support 50 in a lowered condition. For example, FIG. 5b illustrates a situation in which the passageway 30 is in the process of being aligned with a doorway of an aircraft. In particular, the mechanisms for varying the length of the support posts 31R, 31L leads the mechanisms for varying the length of the telescoping support posts 55R, 55L. This is the case when, for instance, the mechanism for varying the length of the support posts 31R, 31L includes a screw having a light-duty thread requiring fewer turns to advance compared to the mechanism for varying the length of the telescoping support posts 55R, 55L. Since it is economically desirable to minimize aircraft turn-around times, there is a significant advantage to providing support posts 31R, 31L that may be rapidly extended or retracted to a desired length. Alternatively, the passageway is adjusted to a desired height for engaging the aircraft, prior to the failsafe support 50 being moved into a raised condition. Maintaining the failsafe support 50 in the lowered condition until after the aircraft is engaged reduces the risk of contact occurring between the passageway 30 and the support portion 53 while the passageway 30 is being adjusted.

Optionally, the passageway 30 and the failsafe support 50 are adjusted during a same overlapping period of time, with the failsafe support 50 maintaining approximately a predetermined minimum clearance between an upper surface of the support portion 53 and a lower surface of the passageway 30. Further optionally, the rate at which the passageway 30 is being adjusted is reduced when the clearance between the upper surface of the support portion 53 and the lower surface of the passageway 30 exceeds a predetermined maximum value.

Figure 5C:
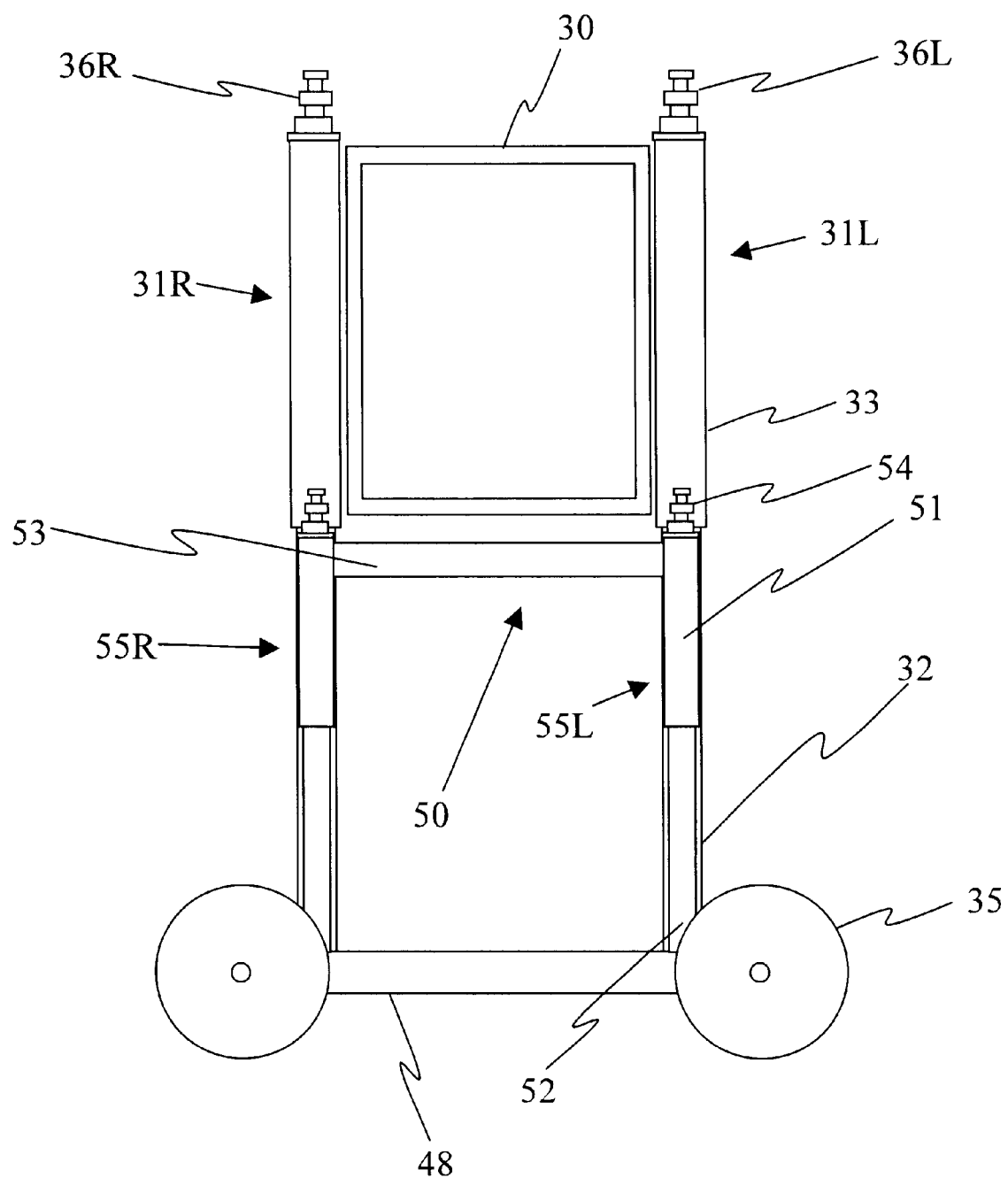
FIG. 5c is an end view of the passenger loading bridge shown in FIG. 5a, but with the passageway in a raised condition and with the fail-safe support in a raised condition.

Referring now to FIG. 5c, shown is an end view of the passenger loading bridge of FIG. 5a, but with the passageway 30 in a raised condition and with the fail-safe support 50 in a raised condition. For instance, the passageway 30 is being supported for servicing an aircraft. In this case, the support posts 31R, 31L bear the entire weight of the passageway 30, and the support portion 53 of the failsafe support 50 is disposed a desired distance below the passageway 30, but preferably does not make contact therewith. As such, the support portion 53 of the failsafe support 50 other than supports the weight of the passageway 30 during normal operation. Advantageously, maintaining a clearance between the support portion and the passageway supports operation of the autoleveling system.

Optionally, the support portion 53 of the failsafe support is brought into close contact with the passageway 30 for supporting the passageway 30 while the aircraft is being serviced. In this optional case, the failsafe support 50 is preferably in communication with the autoleveling system, such that the height of the failsafe support 50 is adjusted by a corresponding amount whenever the height of the passageway 30 is changed. Further optionally, the failsafe support 50 bears less than the entire weight of the passageway 30, the balance of the weight of the passageway 30 being borne by the support posts 31R, 31L.

Figure 5D:
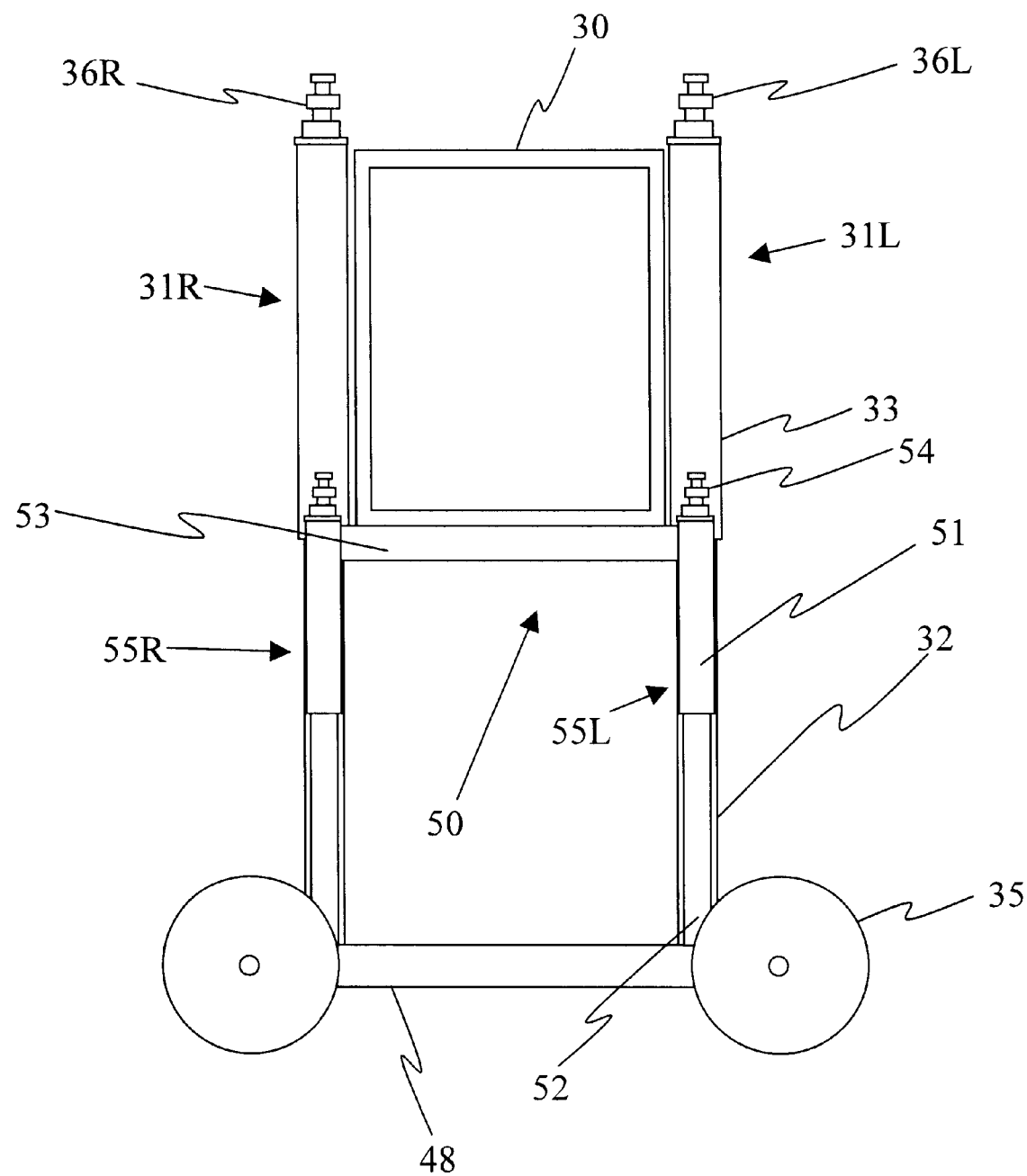
FIG. 5d is an end view of the passenger loading bridge shown in FIG. 5a, but with the passageway being supported by the fail-safe support.

FIG. 5d is an end view of the passenger loading bridge shown in FIG. 5a, but with the passageway being supported by the failsafe support. For example, a failure has occurred involving the support posts 31R, 31L, and the passageway 30 has descended part way, coming to rest on the support portion 53 of the failsafe support 50. In this condition, the self-arresting mechanisms of the failsafe support 50 are supporting the entire weight of the passageway 30, preventing the passageway from descending further. For example, it is not the motor that is braking to prevent the mechanism from "winding down". Optionally, the support portion has disposed along its upper surface a cushioning material for absorbing shock when the passageway comes to rest on the support portion 53.

Figure 5E:
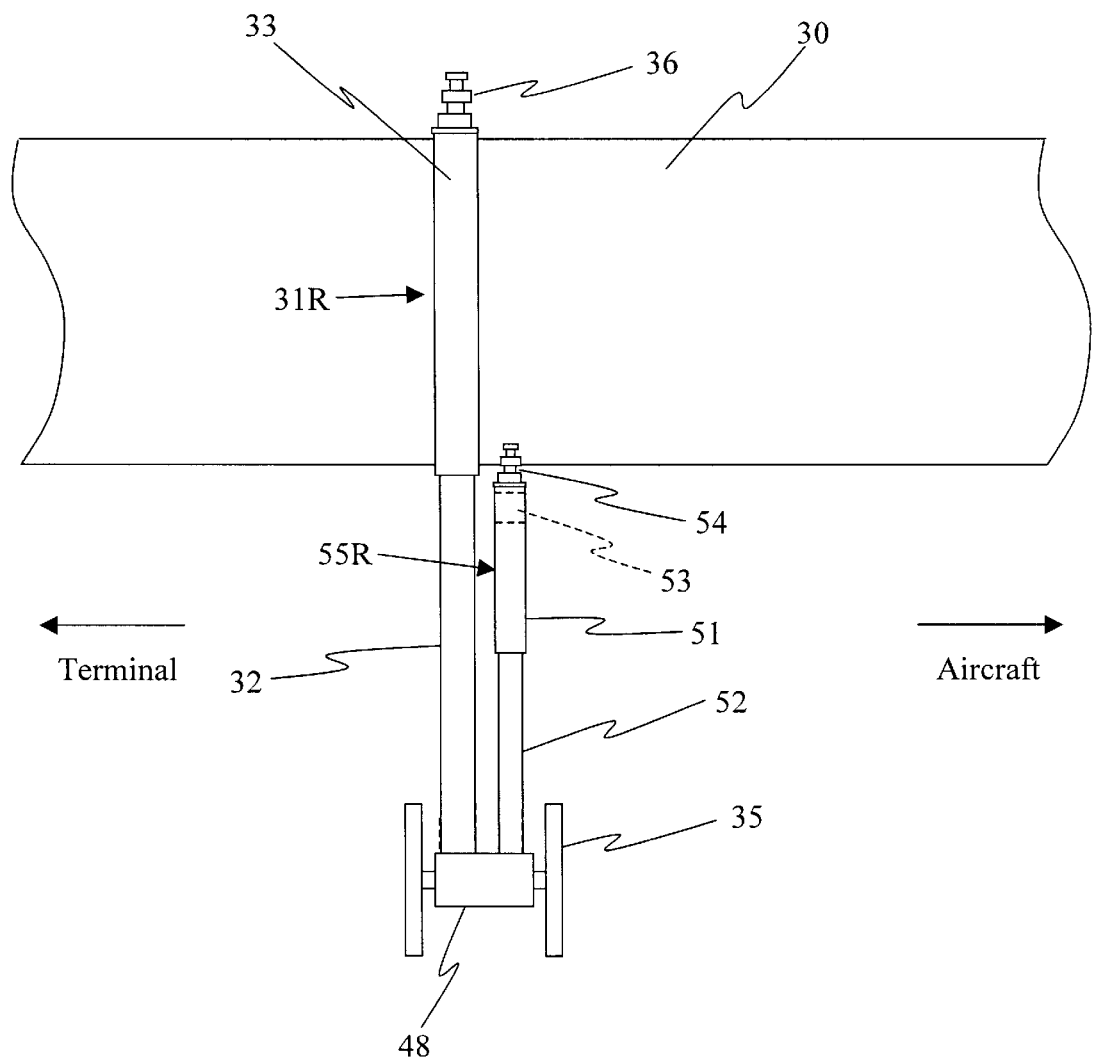
FIG. 5e is a partial side-elevational view of the passenger loading bridge shown in FIG. 5a, with the passageway in a raised condition and with the fail-safe support in a raised condition.

Referring now to FIG. 5e, shown is a partial side-elevational view of the passenger loading bridge of FIG. 5a, with the passageway in a raised condition and with the fail-safe support in a raised condition. As is shown in FIG. 5e, each one of the telescoping support posts 55R, 55L is mounted to the wheel carriage cross member 48 on an outboard side of support posts 31R, 31L. Optionally, each one of the telescoping support posts 55R, 55L is mounted to the wheel carriage cross member 48 on an outboard side of support posts 31R, 31L.

Figure 6A:
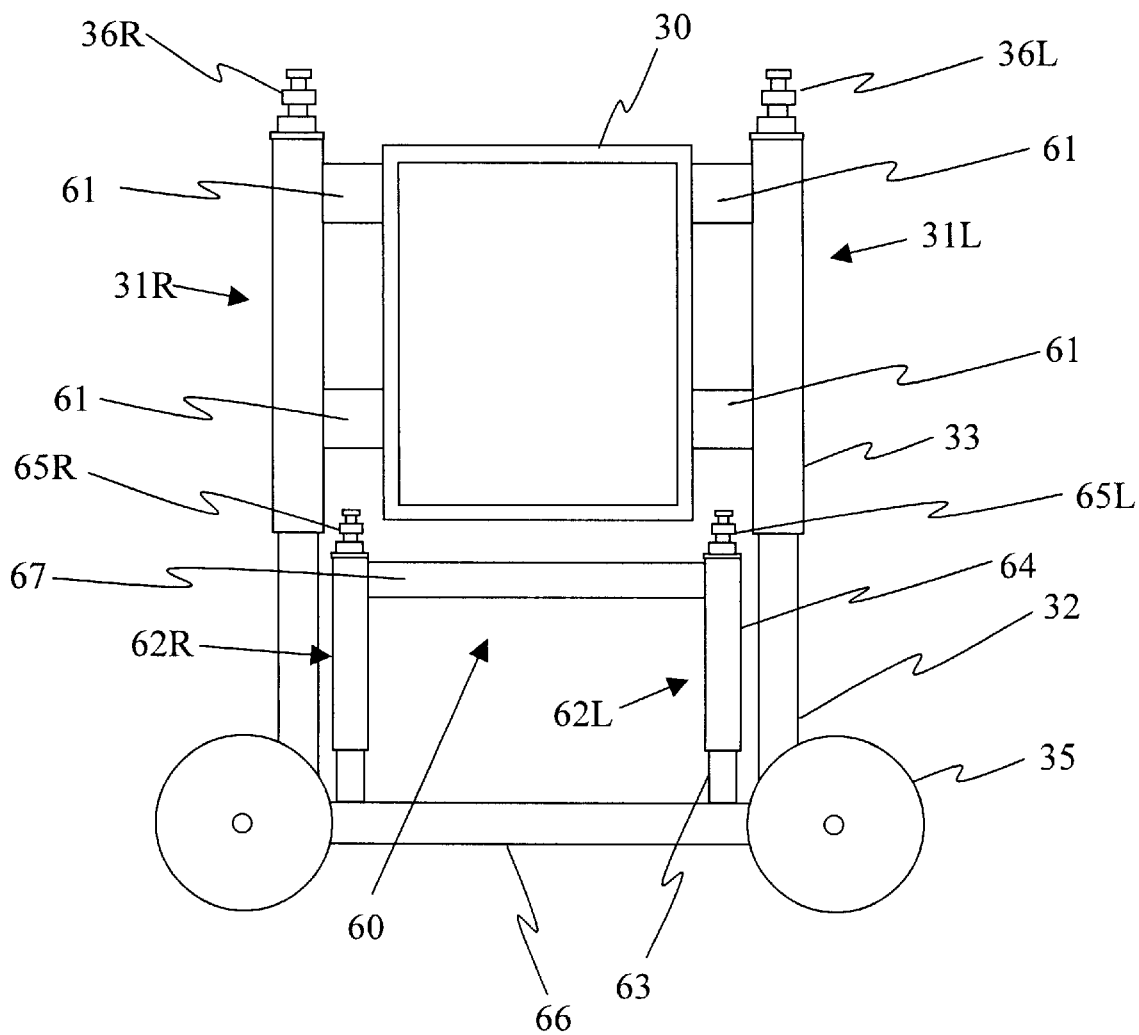
FIG. 6a is an end view of a passenger loading bridge including a failsafe support according to a fourth embodiment of the instant invention, showing the passageway in a lowered condition and the fail-safe support in a lowered condition.

Referring now to FIG. 6a, shown is an end view of a passenger loading bridge including a failsafe support according to a fourth embodiment of the instant invention. A passageway 30 is supported in a height adjustable manner by a main support including height adjustable support posts 31R, 31L mounted to the right and left lateral surface of the passageway 30, respectively, via a plurality of mounts 61. For example, each height adjustable support post 31R, 31L of the main support includes inner and outer hollow sleeves 32 and 33, respectively. The two height adjustable support posts 31R, 31L are mounted, one each near opposite ends of a cross-member 66 of a wheel carriage to which the drive wheels 35 are also mounted. For example, the passenger loading bridge of FIG. 6a is a radial drive bridge, having the drive wheels 35 directed approximately normal to the longitudinal axis of the passageway 30. Accordingly, the outboard end of the passageway 30 is moveable along an arcuate path. Optionally, the passageway 30 includes a telescopic portion (not shown) that is mounted at an outboard end of the passageway 30 for being extended over the wing of an aircraft in a cantilever-like manner. Further optionally, the passageway 30 is a telescopic passageway of an apron drive bridge, in which case the drive wheels are steerable.

Each support post 31R, 31L includes a mechanism (not shown) for varying the length of the support post 31R, 31L. For example, the mechanism is an electromechanical mechanism of a type that is well known in the art, such as for instance a ball screw mechanism. A separate reversible electric motor 36R, 36L is coupled to the mechanism of each support post 31R, 31L, for actuating the mechanism in order to vary the length of the support post 31R, 31L. Preferably, each one of the separate reversible electric motors 36R, 36L is mounted at a location that is above the passageway 30. Optionally, the mechanism is an electrohydraulic mechanism.

Referring still to FIG. 6a, a failsafe support according to a fourth embodiment of the instant invention is shown mounted via a mounting end to the cross-member 66. The failsafe support according to the fourth embodiment, shown generally at 60, includes a height-adjusting portion in the form of two telescoping support posts 62R, 62L mounted one each near opposite ends of the cross-member 48. The two telescoping support posts 62R, 62L are separated by a distance that is less than the separation between the two support posts 31R, 31L, but greater than the distance between the left and right lateral surfaces of the passageway 30. Each telescoping support post 62R, 62L includes a first portion 63 that is telescopically received within a second portion 64, such that the length of the support post 62R, 62L is variable. The support posts 62R, 62L support therebetween a support portion 67. Furthermore, each support post 62R, 62L includes a mechanism (not shown) for adjusting the length of the support post 62R, 62L. The mechanism (not shown) is a self-arresting mechanism, which is capable of "arresting" the failsafe support 60 at a current position in the event of a failure of the support posts 31R, 31L. For example, the mechanism (not shown) is one of a redundant ball-path screw and a ball screw having an acme thread. The mechanism (not shown) of the support post 62R is coupled to the output of a reversible electric motor 65R, and the mechanism (not shown) of the support post 62L is coupled to the output of a reversible electric motor 65L. Advantageously, the self-arresting functionality is an inherent property of the mechanism itself, and is not a result of the braking action of the electric motors 62R, 62L. As such, the electric motors 62R, 62L may have a lighter-duty rating compared to the electric motors 36R, 36L, since the motors are not required to support the entire weight of the passageway 30. Optionally, a type of self-arresting mechanism other than one of the above-mentioned examples is used.

Figure 6B:
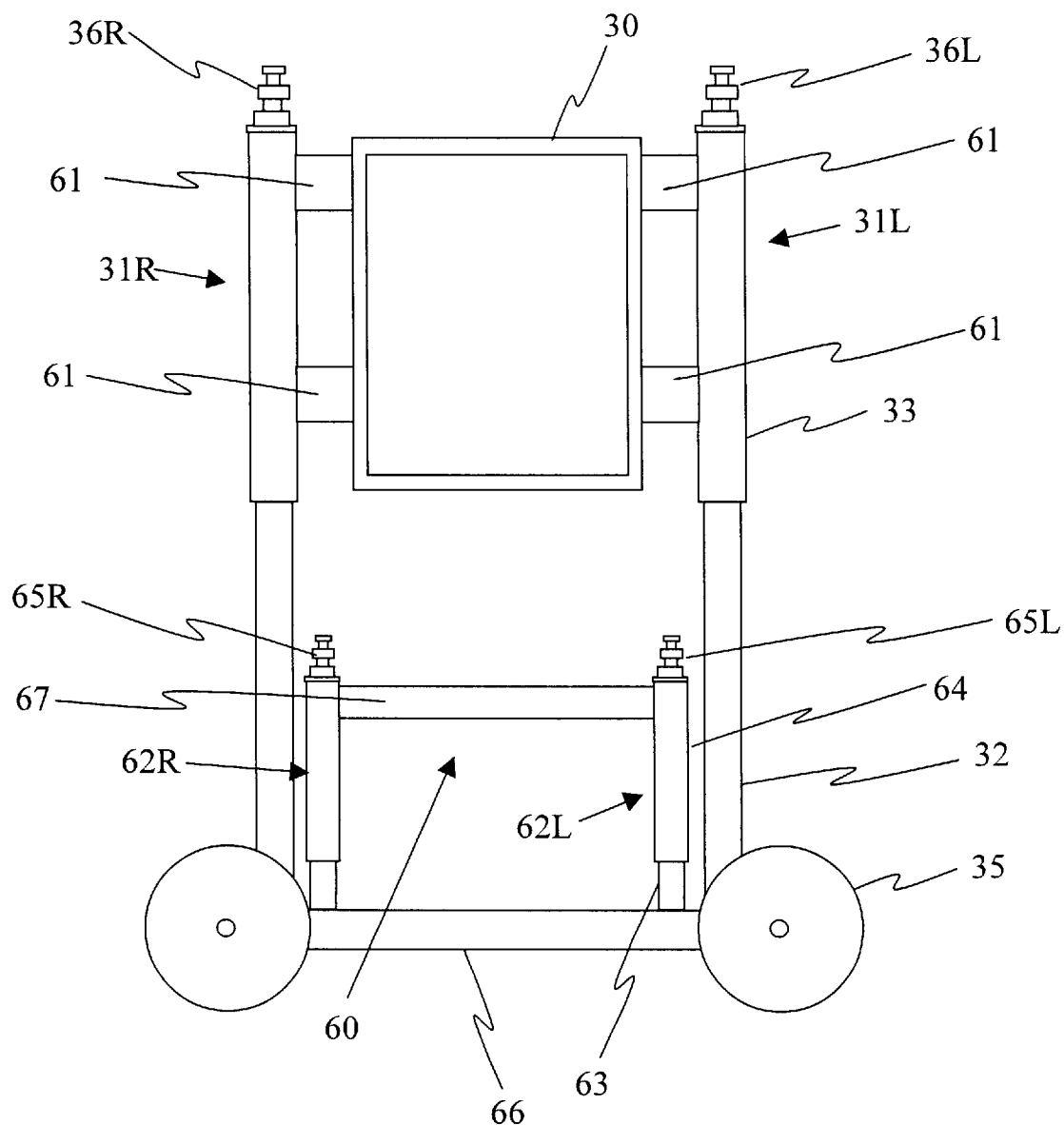
FIG. 6b is an end view of the passenger loading bridge shown in FIG. 6a, but with the passageway in a raised condition and with the fail-safe support in a lowered condition.

Referring now to FIG. 6b, shown is an end view of the passenger loading bridge of FIG. 6a, but with the passageway in a raised condition and with the fail-safe support in a lowered condition. For example, FIG. 6b illustrates a situation in which the passageway 30 is in the process of being aligned with a doorway of an aircraft. In particular, the mechanisms for varying the length of the support posts 31R, 31L leads the mechanism for varying the length of the telescoping support posts 62R, 62L. This is the case when, for instance, the mechanism for varying the length of the support posts 31R, 31L includes a screw having a light-duty thread requiring fewer turns to advance compared to the mechanism for varying the length of the telescoping support posts 62R, 62L. Since it is economically desirable to minimize aircraft turn-around times, there is a significant advantage to providing support posts 31R, 31L that may be rapidly extended or retracted to a desired length. Alternatively, the passageway is adjusted to a desired height for engaging the aircraft, prior to the failsafe support 60 being moved into a raised condition. Maintaining the failsafe support 60 in the lowered condition until after the aircraft is engaged reduces the risk of contact occurring between the passageway 30 and the support portion 67 while the passageway 30 is being adjusted.

Optionally, the passageway 30 and the failsafe support 60 are adjusted during a same overlapping period of time, with the failsafe support 60 maintaining approximately a predetermined minimum clearance between an upper surface of the support portion 67 and a lower surface of the passageway 30. Further optionally, the rate at which the passageway 30 is being adjusted is reduced when the clearance between the upper surface of the support portion 67 and the lower surface of the passageway 30 exceeds a predetermined maximum value.

Figure 6C:
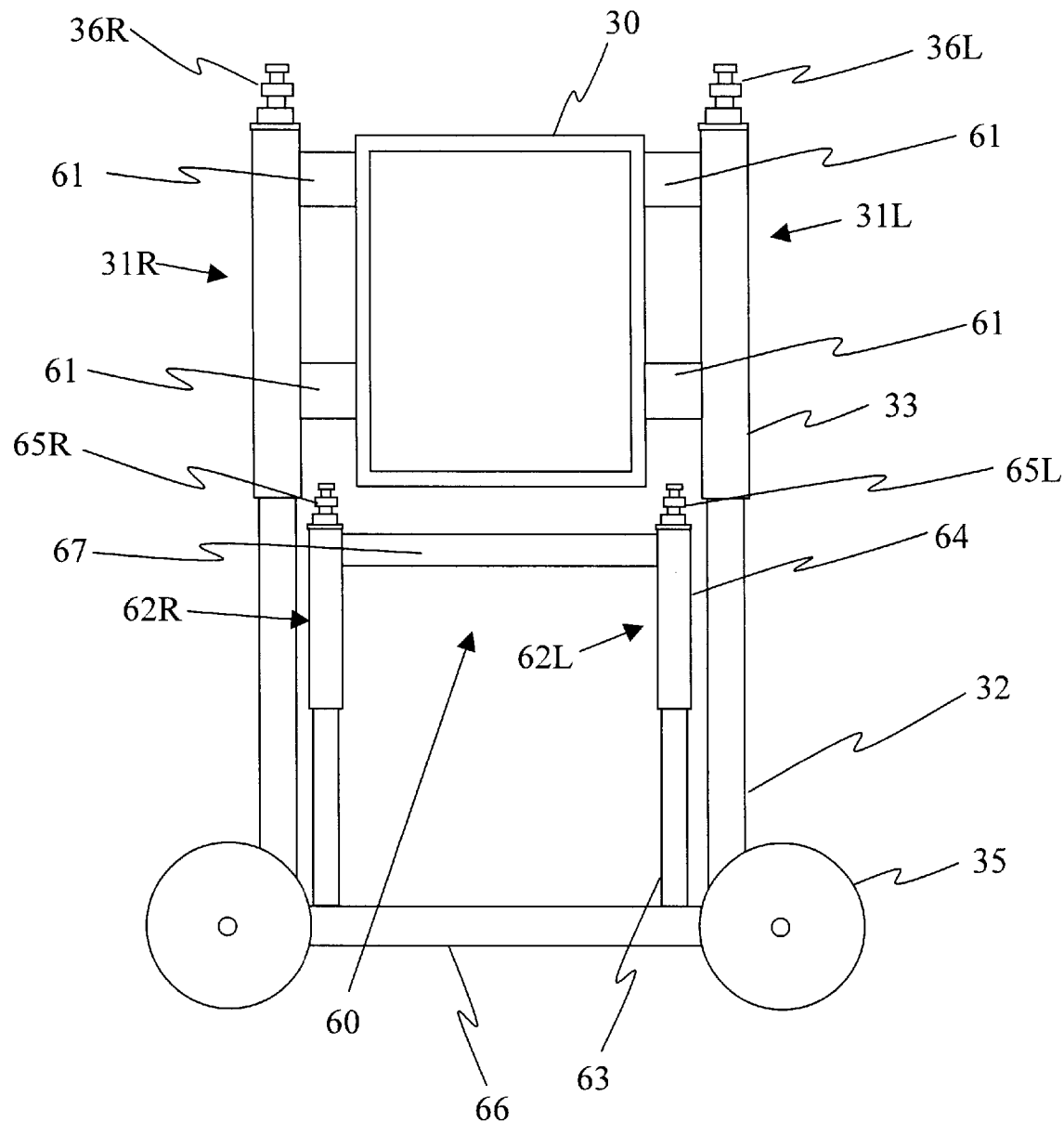
FIG. 6c is an end view of the passenger loading bridge shown in FIG. 6a, but with the passageway in a raised condition and with the fail-safe support in a raised condition.

Referring now to FIG. 6c, shown is an end view of the passenger loading bridge of FIG. 6a, but with the passageway 30 in a raised condition and with the fail-safe support 60 in a raised condition. For instance, the passageway 30 is being supported for servicing an aircraft. In this case, the support posts 31R, 31L bear the entire weight of the passageway 30, and the support portion 67 of the failsafe support 60 is disposed a desired distance below the passageway 30, but preferably does not make contact therewith. As such, the support portion 67 of the failsafe support 60 other than supports the weight of the passageway 30 during normal operation. Advantageously, maintaining a clearance between the support portion and the passageway supports operation of the autoleveling system.

Optionally, the support portion 67 of the failsafe support is brought into close contact with the passageway 30 for supporting the passageway 30 while the aircraft is being serviced. In this optional case, the failsafe support 60 is preferably in communication with the autoleveling system, such that the height of the failsafe support 60 is adjusted by a corresponding amount whenever the height of the passageway 30 is changed. Further optionally, the failsafe support 60 bears less than the entire weight of the passageway 30, the balance of the weight of the passageway 30 being borne by the support posts 31R, 31L.

Figure 6D:
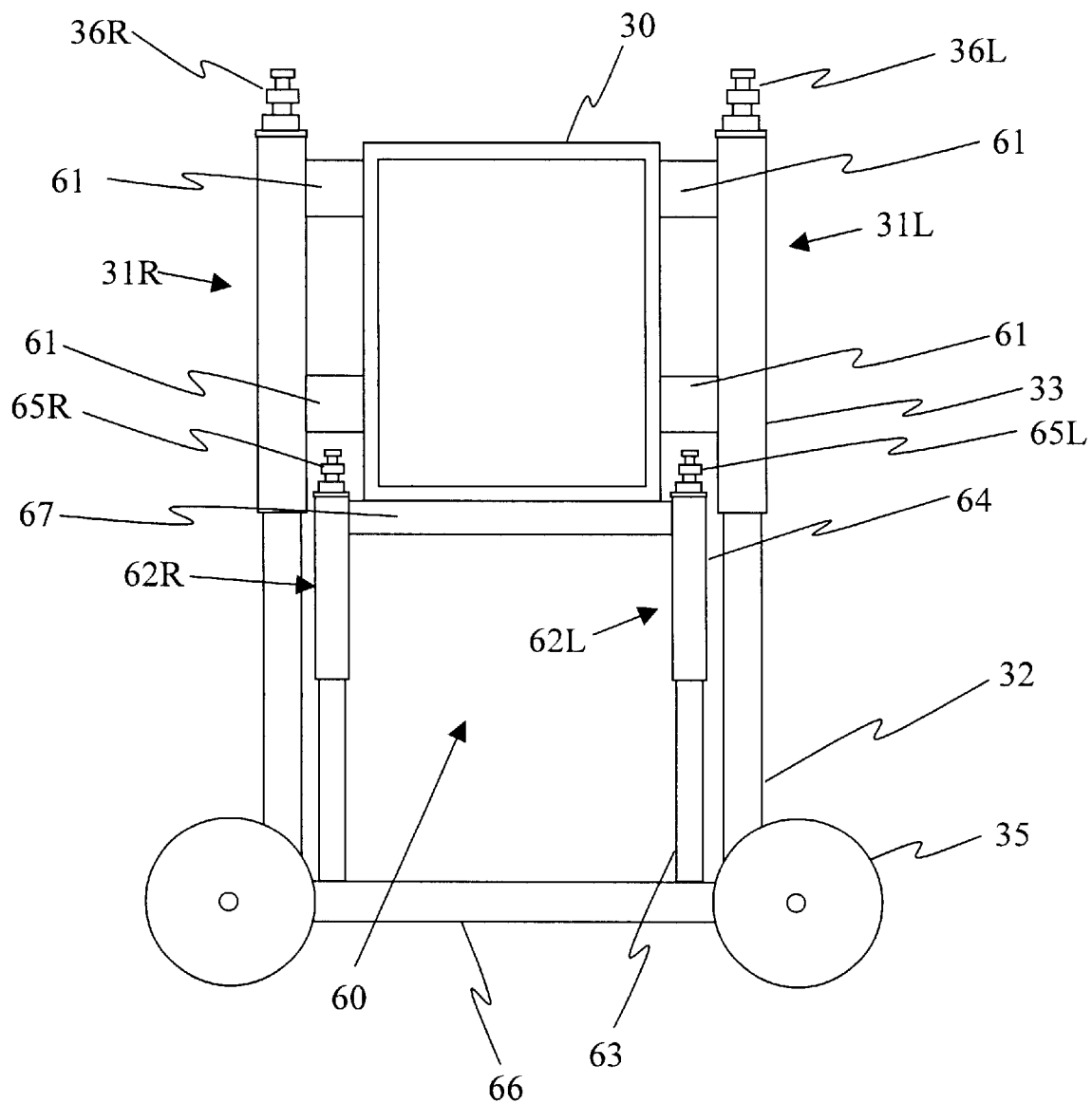
FIG. 6d is an end view of the passenger loading bridge shown in FIG. 6a, but with the passageway being supported by the fail-safe support.

FIG. 6d is an end view of the passenger loading bridge shown in FIG. 6a, but with the passageway being supported by the failsafe support. For example, a failure has occurred involving the support posts 31R, 31L, and the passageway 30 has descended part way, coming to rest on the support portion 67 of the failsafe support 60. In this condition, the self-arresting mechanism of the failsafe support 60 is supporting the entire weight of the passageway 30, preventing the passageway from descending further. For example, it is not the motor that is braking to prevent the mechanism from "winding down". Optionally, the support portion has disposed along its upper surface a cushioning material for absorbing shock when the passageway comes to rest on the support portion 67.

Figure 6E:
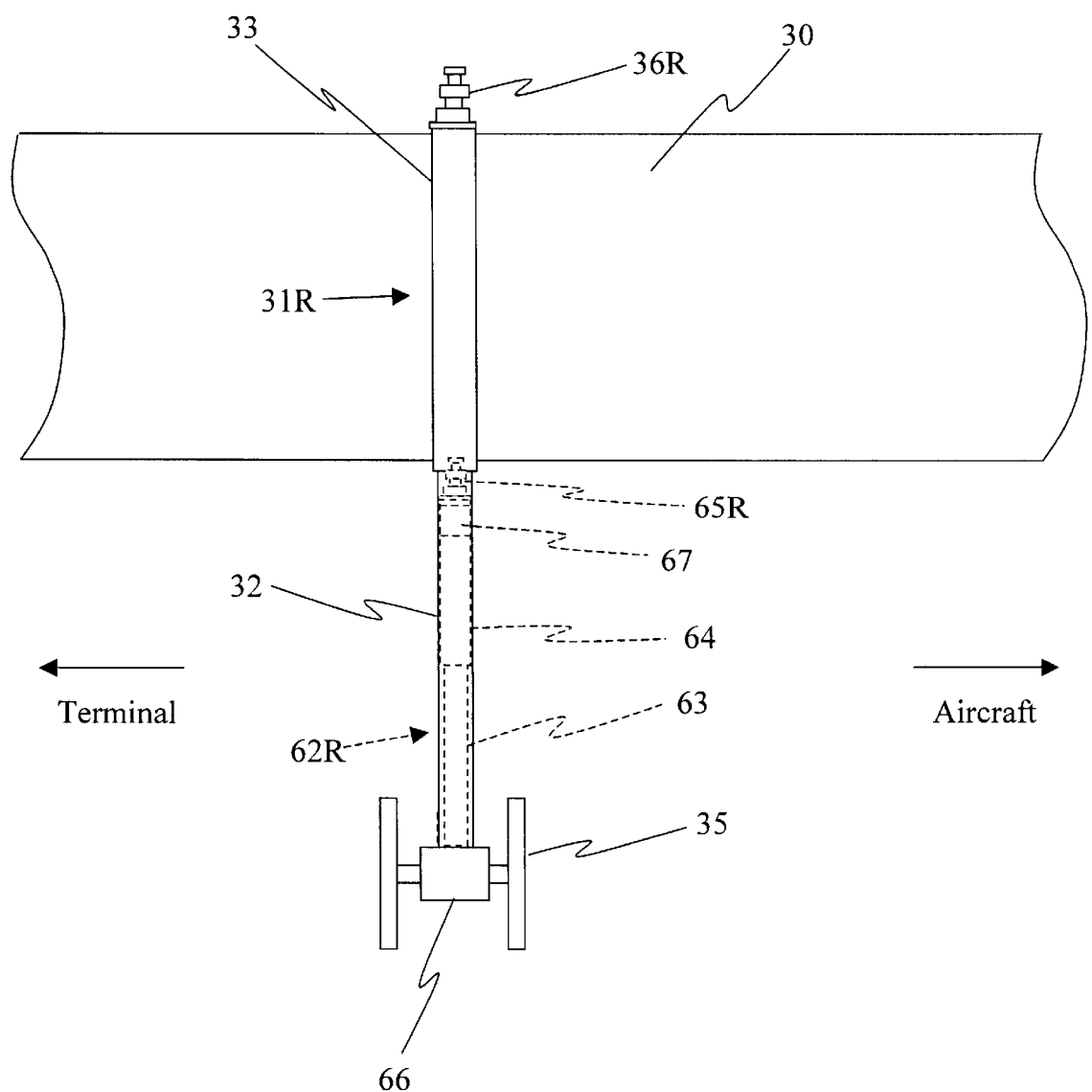
FIG. 6e is a partial side-elevational view of the passenger loading bridge shown in FIG. 6a, with the passageway in a raised condition and with the fail-safe support in a raised condition.

Referring now to FIG. 6e, shown is a partial side-elevational view of the passenger loading bridge of FIG. 6a, with the passageway in a raised condition and with the fail-safe support in a raised condition. As is shown in FIG. 6e, each one of the telescoping support posts 62R, 62L is mounted to the wheel carriage cross member 66 between the support posts 31R, 31L, and a same position along the length of the passageway 30 as the support posts 31R, 31L.

Figure 10:
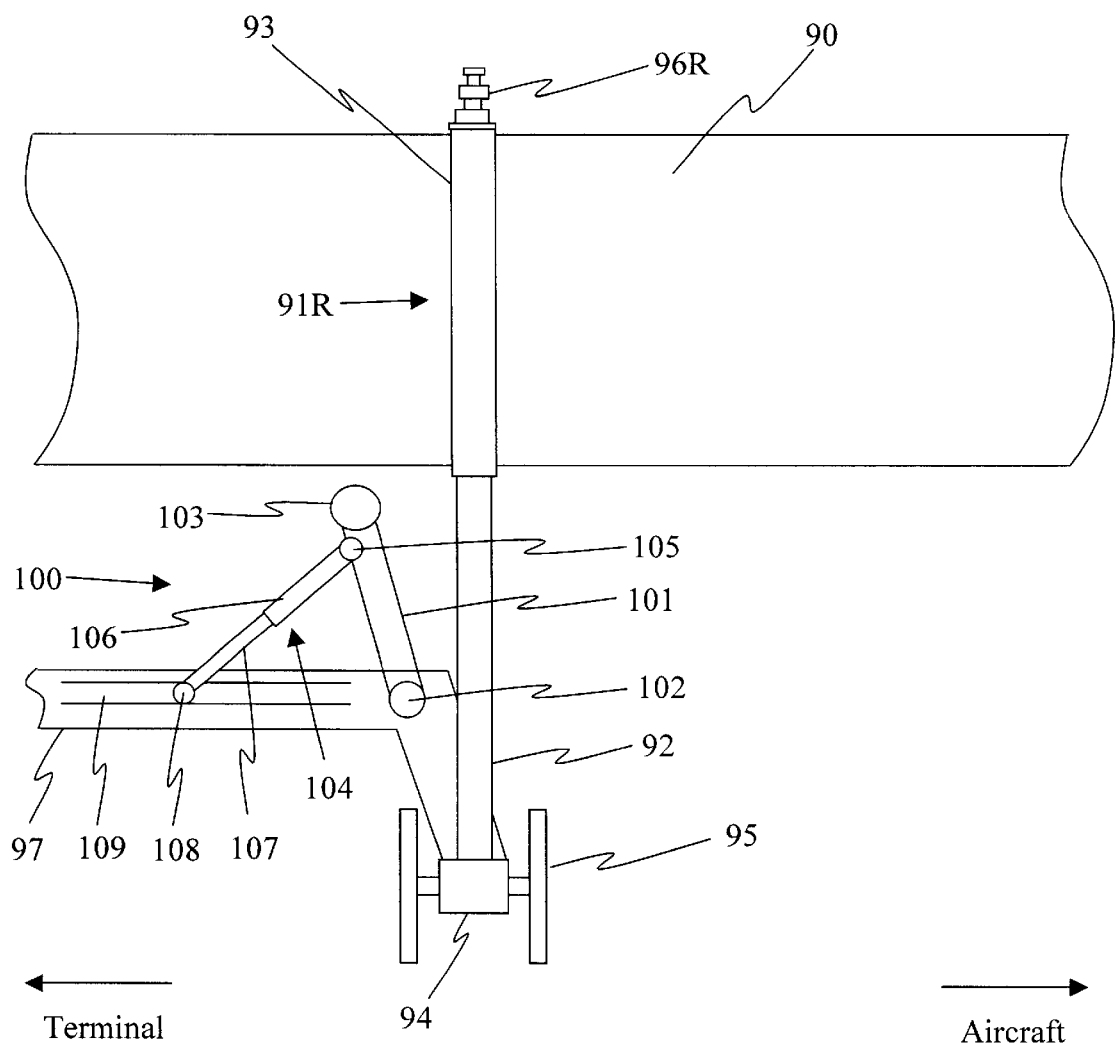

Referring now to FIG. 10, shown is a partial side-elevational view of a radial drive passenger loading bridge including a failsafe support according to a fifth embodiment of the instant invention. A passageway 90 is supported in a height adjustable manner using a height adjustable support post 91R and a not illustrated support post 91L, which are mounted to the right and left lateral surface of the passageway 90, respectively. For example, each height adjustable support post 91R, 91L includes inner and outer hollow sleeves 92 and 93, respectively. The two height adjustable support posts 91R, 91L are mounted, one each near opposite ends of a cross-member 94 of a wheel carriage to which the drive wheels 95 are also mounted. The passenger loading bridge of FIG. 10 is for example a radial drive bridge, having the drive wheels 95 directed approximately normal to the longitudinal axis of the passageway 90. Accordingly, the outboard end of the passageway 90 is moveable along an arcuate path. A fixed-length support 97 is pivotally mounted to a stationary rotunda at one end, and fixedly mounted to the cross-member 94 of the wheel carriage at the other end. Optionally, the passageway 90 includes a telescopic portion (not shown) that is mounted at the outboard end of the passageways 90 for being extended over the wing of an aircraft in a cantilever-like manner.

Referring still to FIG. 10, each support post 91R, 91L includes a mechanism (not shown) for varying the length of the support post 91R, 91L. For example, the mechanism is an electromechanical mechanism of a type that is well known in the art, such as for instance a ball screw mechanism. A reversible electric motor 96R is coupled to the mechanism of the support post 91R for actuating the mechanism in order to vary the length of the support post 31R, and a separate (not illustrated) reversible electric motor 96L is coupled to the mechanism of the (not illustrated) support post 91L, for actuating the mechanism in order to vary the length of the support post 31L. Preferably, each one of the separate reversible electric motors 36R, 36L is mounted at a location that is above the passageway 30. Optionally, the mechanism is an electrohydraulic mechanism.

Referring still to FIG. 10, a failsafe support according to a fifth embodiment of the instant invention is shown mounted via a mounting end to the fixed-length support 97. The failsafe support according to the fifth embodiment, shown generally at 100, includes a height-adjusting portion in the form of a support post 101 that is pivotally attached to the fixed length support 97 via a pivot 102. The support post 101 is preferably also of fixed length, and includes a support portion 103 at an end opposite the pivotally attached mounting end. A telescopic support, shown generally at 104, is pivotally mounted at one end to the support post 101, and is pivotally and slidingly mounted to the fixed-length support at an opposite end via a coupling 108 engaged within track 109. The telescopic support 104 includes a first portion 107 that is telescopically received within a second portion 106, such that the length of the telescopic support 104 is variable. The telescopic support 104 includes a mechanism (not shown) for adjusting the length of the telescopic support 104. The mechanism (not shown) is a self-arresting mechanism, which is capable of "arresting" the failsafe support 100 at a current position in the event of a failure of the support posts 91R, 91L. For example, the mechanism (not shown) is one of a redundant ball-path screw and a ball screw having an acme thread. The mechanism (not shown) of the telescopic support 104 is coupled to the output of a reversible electric motor (not shown). Advantageously, the self-arresting functionality is an inherent property of the mechanism itself, and is not a result of the braking action of the (not shown) electric motor. As such, the electric motor may have a lighter-duty rating compared to the electric motors 96R, 96L, since the motor are not required to support the entire weight of the passageway 30. Optionally, the telescopic support 104 is replaced by a fixed length support post (not shown) which is pivotally mounted at one end to the support post 101, and which is pivotally and slidingly mounted to the fixed-length support 97 at an opposite end via a coupling (not shown) engaged within track 109.

According to the fifth embodiment of the failsafe support, the self-arresting mechanism is arranged other than parallel to the mechanisms of the support post 91R, 91L. As the coupling 108 is being slid along track 109 and/or the length of telescopic support 104 is being varied, the angle between the support post 101 and the fixed-length support 97 changes. Accordingly, the height of the support portion 103 is variable. Optionally, the support post 101 is moveable between two positions only, including a retracted position in which the support post 101 is substantially parallel to the fixed-length support 97, and a fully extended position in which the coupling 108 enters a retaining portion of the track 109. The fully extended position is such that the support portion 103 is always brought to a same height, as when the passenger loading bridge is used for servicing substantially a single type of aircraft.

Figure 7:
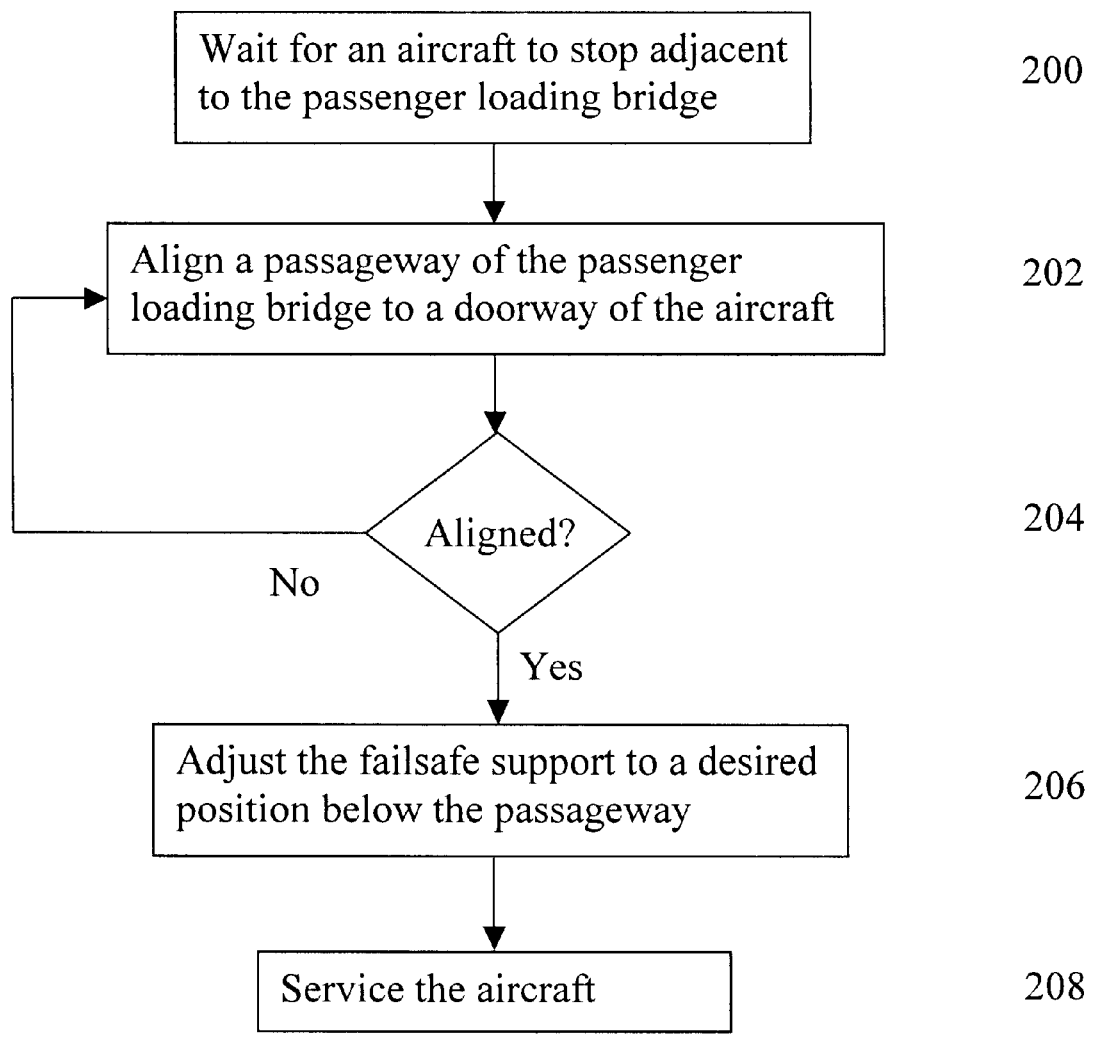
FIG. 7 is a simplified flow diagram of a method of positioning a failsafe support.

Referring now to FIG. 7, shown is a simplified flow diagram of a method of positioning a failsafe support. The method of FIG. 7 is applicable with a failsafe support according to any one of the first through fifth embodiments of the instant invention. Furthermore, the method steps that are outlined in FIG. 7 may be performed under the control of any one of: a manual bridge alignment system; a semi-automated bridge alignment system; and, an automated bridge alignment system. At step 200, an aircraft is allowed to stop adjacent to the passenger loading bridge, for example the aircraft is allowed to stop at a stopping position that is predetermined for a type of the aircraft. After the aircraft has stopped, then at step 202 a bridge alignment operation is initiated for aligning a passageway of the passenger loading bridge to a doorway of the aircraft. Step 202 is optionally performed by a human bridge operator using a control panel for manually aligning the bridge, by a human operator using control panel for aligning the bridge with the assistance of a semi-automated control system, or by a bridge controller including a processor for executing program code for aligning the bridge in a fully automated manner. Once it is determined at decision step 204 that the passageway of the passenger loading bridge is aligned to the doorway of the aircraft, then the failsafe support is adjusted at step 206 to a desired position below the passageway. Preferably, the failsafe support is adjusted under the control of the same system that was used to align the passageway to the door of the aircraft. Optionally, the failsafe support is positioned manually subsequent to the passageway being aligned under the control of a fully automated bridge alignment system, etc. Further optionally, the failsafe support is moved into the desired position only upon activation of the bridge auto-leveling system, which system subsequently moves the failsafe support to a new desired position each time the passageway is raised or lowered during servicing of the aircraft at step 208.

Figure 8:
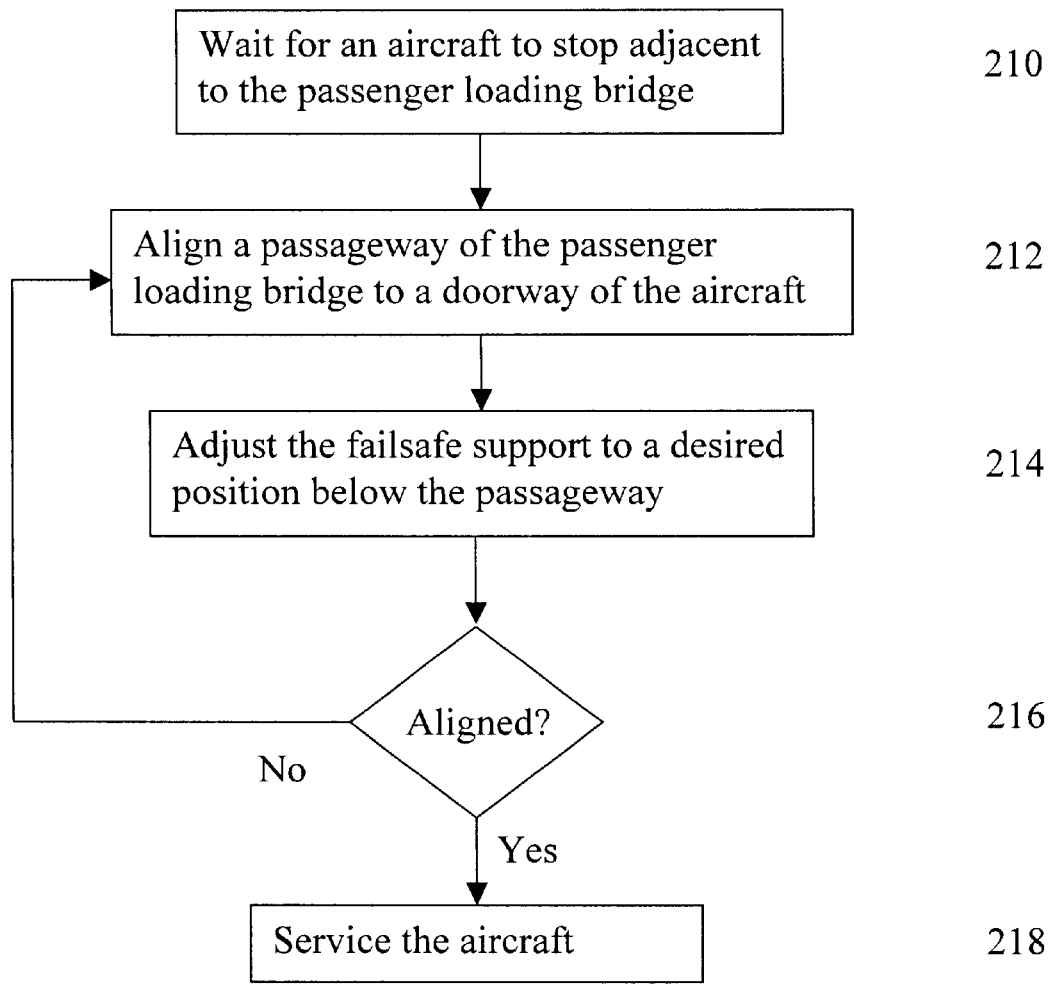
FIG. 8 is a simplified flow diagram of another method of positioning a failsafe support.

Referring now to FIG. 8, shown is a simplified flow diagram of another method of positioning a failsafe support. The method of FIG. 8 is applicable with a failsafe support according to any one of the first through fifth embodiments of the instant invention. Furthermore, the method steps that are outlined in FIG. 8 may be performed under the control of any one of: a manual bridge alignment system; a semi-automated bridge alignment system; and, an automated bridge alignment system. At step 210, an aircraft is allowed to stop adjacent to the passenger loading bridge, for example the aircraft is allowed to stop at a stopping position that is predetermined for a type of the aircraft. After the aircraft has stopped, then at step 212 a bridge alignment operation is initiated for aligning a passageway of the passenger loading bridge to a doorway of the aircraft. During a same overlapping period of time, another operation is initiated at step 214 for adjusting the failsafe support to a desired position below the passageway. Preferably, the desired position corresponds to a minimum clearance between a lower surface of the passageway and a support portion of the failsafe support. Optionally, the desired position corresponds to a range of clearance distances, such that the passageway is slowed relative to the failsafe support if the clearance distance exceeds a predetermined maximum value, and the failsafe support is slowed relative to the passageway if the clearance distance decreases to less than a predetermined minimum value. Once it is determined at decision step 214 that the passageway of the passenger loading bridge is aligned to the doorway of the aircraft and that the failsafe support is adjusted to the desired position below the passageway, then at step 216 servicing of the aircraft begins.

Optionally, steps 212 and 214 are performed by a human bridge operator using a control panel for manually aligning the bridge, by a human operator using control panel for aligning the bridge with the assistance of a semi-automated control system, or by a bridge controller including a processor for executing program code for aligning the bridge in a fully automated manner. Of course, further optionally the failsafe support is positioned manually subsequent to the passageway being aligned under the control of a fully automated bridge alignment system, etc. Further optionally, the failsafe support is controlled by the bridge auto-leveling system during servicing of the aircraft at step 216, which adjusts the failsafe support to a new desired position each time the passageway is raised or lowered during servicing of the aircraft at step 216.

Figure 9:
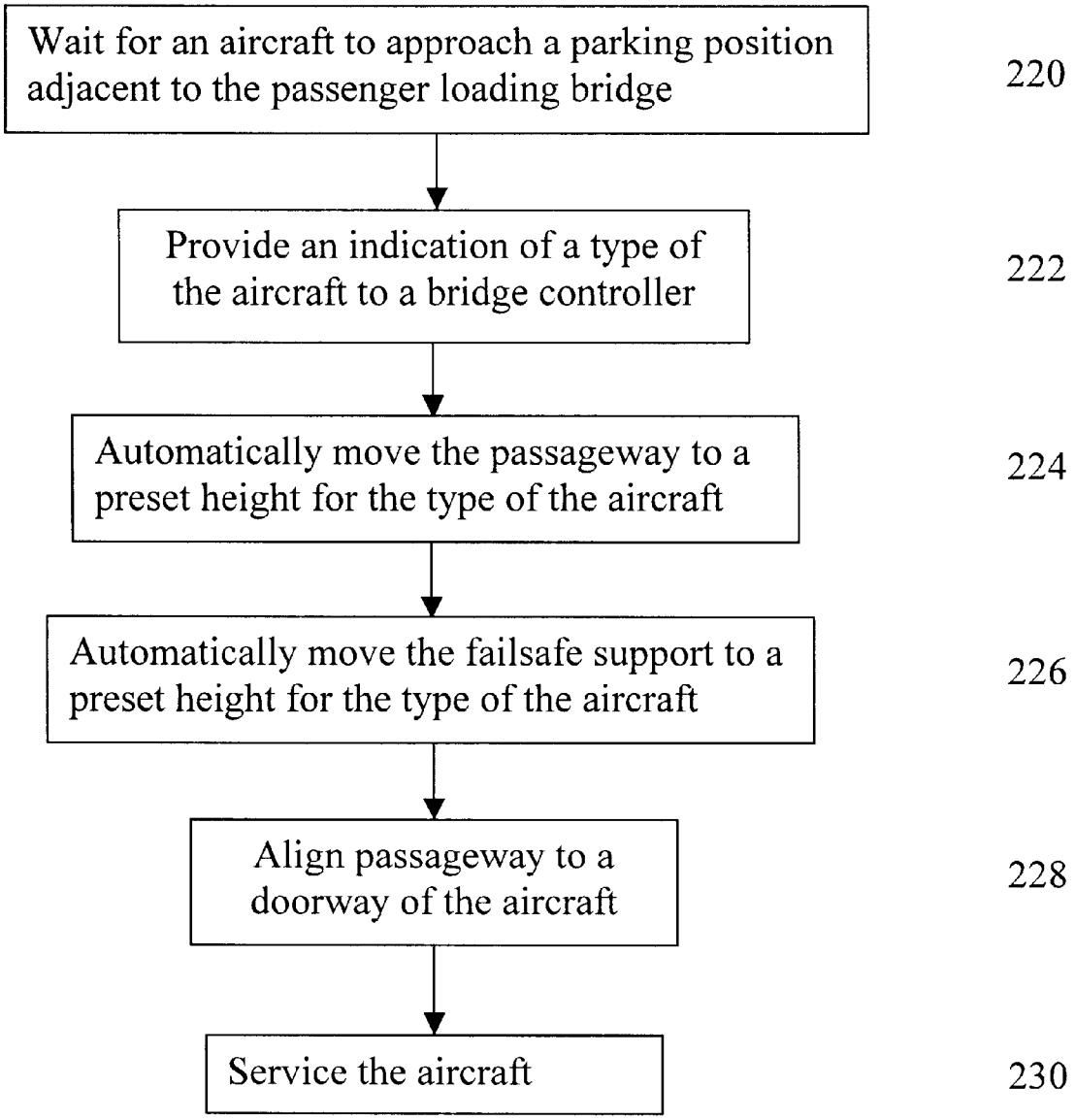
FIG. 9 is a simplified flow diagram of still another method of positioning a failsafe support; and, FIG. 10 is a partial side-elevational view of a passenger loading bridge including a failsafe support according to a fifth embodiment of the instant invention.

Referring now to FIG. 9, shown is a simplified flow diagram of still another method of positioning a failsafe support. The method of FIG. 9 is applicable with a failsafe support according to any one of the first through fifth embodiments of the instant invention. In particular, the method of FIG. 9 is for use with one of a semi-automated bridge control system and a fully automated bridge control system, whereby the passageway is preset to a predetermined height in dependence upon a type of the aircraft that is to be serviced. For instance, semi-automated bridge alignment systems are known, which are equipped with controls that automatically cause a height adjustment mechanism to move the passageway to a predetermined height. One type of semi-automatic control for a vertical height adjustment mechanism includes an electric control which has a control panel equipped with a plurality of push button type switches, each of which is labeled with the name of a different type of aircraft. Actuating a switch causes the mechanism to move the passageway to a predetermined height for the selected type of aircraft. At step 220, an aircraft is allowed to approach a parking position adjacent to the passenger loading bridge. At step 222, an indication of a type of the aircraft is provided to the one of a semi-automated bridge control system and a fully automated bridge control system. The indication is optionally provided manually by a human operator, provided from an electronic database such as a flight information database of an airport terminal, or provided as an output from an aircraft recognition system. The passageway is automatically moved at step 224 to a predetermined height for the indicated type of aircraft. At step 226, the failsafe support is automatically moved to a predetermined height lower than the predetermined height of the passageway. For example, the predetermined height of the failsafe support provides a desired minimum clearance to a lower surface of the passageway. At step 228 the passageway is aligned to the doorway of the aircraft, under one of manual control, semi-automated control and fully automated control. The aircraft is serviced at step 229.

The instant invention includes a "Failsafe Support Upgrade Kit" or retrofit unit, for upgrading existing passenger loading bridges. This kit physically connects to an existing wheel carriage or main support frame of an apron drive bridge, radial drive bridge or over the wing bridge. Of course, the kit may also be used in conjunction with passenger loading bridges that do not include a wheeled main support member, such as for instance a pedestal bridge. The kit comprises a height-adjustable failsafe support including a self-arresting mechanism and a motor, the failsafe support having a mounting end that is adapted for being physically coupled with the existing wheel carriage or main support frame. Preferably, the motor provides sufficient power to raise and lower the failsafe support but insufficient power to raise and lower the passenger loading bridge. Such a motor requires less energy compared to the motors that are typically employed in conjunction with the main support. The kit optionally includes an electrical controller unit for supporting manual, semi-automated or fully automated operation of the failsafe support. Alternatively, the kit includes an interface for coupling the failsafe support to an exiting bridge controller unit, such as for example a bridge controller unit for controlling the main support. Advantageously, the interface supports a synchronized operation of the main support and the failsafe support, such that the main support and the failsafe support move during a same overlapping period of time, either at a same speed or at different speeds.

An embodiment of the controller includes a distance measuring circuit, for example an infrared distance measuring circuit, and a control circuit for maintaining a predetermined distance between the support bar and a bottom surface of the passenger loading bridge. When such a control circuit is included, the kit is easily installed in a safe and straightforward fashion with little expertise and without significant knowledge of the existing bridge structure.

It is an advantage of the instant invention that the failsafe support and the main support each utilize a different type of lifting mechanism. Typically, the main support lifting mechanism is optimized to rapidly raise and lower the passenger loading bridge while consuming a reduced amount of power over the failsafe mechanism when used to lift and lower the passenger loading bridge. Although this is desirable from an economic standpoint, it nevertheless compromises safety. It is possible to provide redundant lifting mechanisms of a same type, however, the redundant lifting mechanisms are also prone to failure. For instance, if a type of failure is a result of a manufacturing problem, then all mechanisms that are obtained from a same manufacturer could be susceptible to the same type of failure. However, providing a failsafe support that includes a different type of lifting mechanism as a secondary support lowers the probability that the main support and the secondary support will fail at a same time. It is a further advantage of the instant invention that, since the failsafe support does not raise and lower the weight of the passageway, a very inefficient mechanism may be used, which would otherwise be extremely costly or unworkable for supporting a substantial portion the weight of the passenger loading bridge during motion. For instance, the thread of a very safe drive screw type mechanism requires many turns in order to advance the screw, which increases the amount of friction that the motor must overcome in order to raise and lower the passenger loading bridge. Such a mechanism is very slow and very expensive to operate when it is used to raise and lower the weight of the entire passenger loading bridge, and a heavy-duty motor is required in order to overcome the friction of the thread under the weight of the passageway. Advantageously, the same type of mechanism is relatively fast and inexpensive to operate when it is used to raise and lower the weight of a support bar only, and a further advantage is that a very light-weight motor may be used because the weight of the support bar does not result in an excessive amount of friction as the screw is turned. Of course, when the main support fails and the passageway comes to rest atop the failsafe support, the resulting downward force acting upon the mechanism produces a great deal of friction and prevents the mechanism from "winding down". Despite the fact that a very light weight motor is provided with the failsafe support, the weight of the passageway does not cause the mechanism to "wind down" because the mechanism is self-locking. Accordingly, removing the weight of the bridge from the failsafe support during normal operation gives rise to the above-mentioned advantages.

Numerous other embodiments may be envisaged without departing from the spirit and scope of the invention.

What is claimed is:

1. A failsafe support for a passenger loading bridge having a passageway that is supported in a height-adjustable manner by a main support including at least a height-adjustable support post, the failsafe support comprising:
   a controller;
   a support portion for being positioned adjacent to a lower surface of a passenger loading bridge passageway in a first operating condition and for engaging the lower surface of the passenger loading bridge passageway in a second operating condition;
   a height-adjusting portion extending from the support portion to a mounting end, the mounting end for being mounted to the main support; and,
   a self-arresting mechanism for being controlled by the controller, and for varying in two opposing directions at least one of a length of the height-adjusting portion and an orientation of the height-adjusting portion in the first operating condition in response to the controller, and for maintaining approximately constant the at least one of a length of the height-adjusting portion and an orientation of the height-adjusting portion in the second operating condition,
   wherein the failsafe support supports a weight that is significantly less than an entire weight of the passenger loading bridge passageway when in the first operating condition, and wherein the failsafe support bears a substantial portion of the weight of the passenger loading bridge passageway when in the second operating condition.

2. A failsafe support according to claim 1 wherein the support portion is spaced apart from a lower surface of a passenger loading bridge passageway in the first operating condition.

3. A failsafe support according to claim 1 wherein the self-arresting mechanism comprises a motor.

4. A failsafe support according to claim 3 wherein the self-arresting mechanism includes a drive screw.

5. A failsafe support according to claim 4 wherein the height-adjusting portion includes a fixed length support post that is pivotally mounted to the main support.

6. A failsafe support according to claim 4 wherein the drive screw is a redundant ball-path screw.

7. A failsafe support according to claim 4 wherein the drive screw includes an acme thread.

8. An apparatus for supporting a passageway of a passenger loading bridge in a height-adjustable manner, comprising:
   a main support, including:
      a wheeled frame; and,
      a lift mechanism having a first end and a second end opposite the first end, the lift mechanism mounted to the wheeled frame at the first end and mounted to a passageway of a passenger loading bridge at the second end, the lift mechanism including at least a first motor coupled for supporting the passageway of the passenger loading bridge in a height adjustable manner;
   a controller; and,
   a failsafe support for being controlled by the controller and having a support end and having a height-adjusting end that is adjustable in two opposing directions, the failsafe support mounted at the height-adjusting end to the wheeled frame of the main support such that, in use, the support end is positionable adjacent to a lower surface of the passageway of the passenger loading bridge being supported by the lift mechanism of the main support in response to the controller,
   wherein the failsafe support maintains the passageway of the passenger loading bridge at approximately a height of the support end in the event of a failure of the lift mechanism of the main support.

9. An apparatus according to claim 8 wherein the failsafe support includes a self-arresting mechanism for varying a length of a telescoping support post.

10. An apparatus according to claim 9 wherein the failsafe support further comprises a second motor coupled for raising and lowering the self-arresting mechanism.

11. An apparatus according to claim 10 wherein the second motor is capable of providing a maximum amount of power that is insufficient to raise and lower the passageway of the passenger loading bridge.

12. An apparatus according to claim 10 wherein the self-arresting mechanism is for moving at a maximum rate that is slow compared to a maximum rate of the lift mechanism of the main support.

13. An apparatus according to claim 10 wherein use the controller of the failsafe support is for moving the self-arresting mechanism at an approximately same rate as the lift mechanism of the main support during different non-overlapping periods of time.

14. An apparatus according to claim 10 wherein the controller of the failsafe support is for moving the self-arresting mechanism at an approximately same rate as the lift mechanism of the main support during different overlapping periods of time.

15. An apparatus according to claim 9 wherein the self-arresting mechanism comprises a drive screw.

16. An apparatus according to claim 15 wherein the drive screw is a redundant ball-path screw.

17. An apparatus according to claim 15 wherein the drive screw includes an acme thread.

18. A kit for retrofitting a passenger loading bridge equipped with a main support member including at least a height-adjustable lift mechanism, the kit comprising:
   a failsafe support member having a mounting portion adapted to be mounted to a frame of a main support member and a support portion for supporting the passenger loading bridge, the failsafe support member including a self-arresting mechanism for varying a distance between the mounting portion and the support portion;

a controller; and, a motor for being controlled by the controller so as to provide to the self-arresting mechanism a sufficient amount of power for varying in two opposing directions the distance between the mounting portion and the support portion when the failsafe support is other than supporting a weight of the passenger loading bridge and in response to a control signal from the controller.

19. A kit according to claim 18 wherein the self-arresting mechanism comprises a drive screw.

20. A kit according to claim 19 wherein the drive screw is a redundant ball-path screw.

21. A kit according to claim 19 wherein the drive screw includes an acme thread.

22. A kit according to claim 18 wherein the motor is capable of providing a maximum amount of power that is less than a sufficient amount of power for varying in an upward direction the distance between the mounting portion and the support portion when the failsafe support is supporting a weight of the passenger loading bridge.

23. A kit according to claim 18 wherein during use the distance between the mounting portion and the support portion of the failsafe support member remains approximately the same when power is not being provided from the motor to the self-arresting mechanism.

24. A kit according to claim 18 wherein the controller is an electrical controller for supporting a synchronized operation of the self-arresting mechanism of the failsafe support member and the at least a height-adjustable lift mechanism of the main support member.

25. A kit according to claim 24 wherein the electrical controller comprises a sensor for sensing a distance between the support and a surface of the passenger loading bridge.

26. A kit according to claim 24 wherein the electrical controller comprises a sensor for sensing a relative height of the support and a surface of the passenger loading bridge.

27. A failsafe support according to claim 1, wherein the controller is an electrical controller unit for supporting at least one of manual, semi-automated and fully automated operation of the failsafe support.

28. A failsafe support according to claim 1, wherein the controller comprises an interface for coupling the failsafe support to an exiting bridge controller unit.

29. An apparatus according to claim 8, wherein the controller is an electrical controller unit for supporting at least one of manual, semi-automated and fully automated operation of the failsafe support.

30. An apparatus according to claim 8, wherein the controller comprises an interface for coupling the failsafe support to an exiting bridge controller unit.

31. A kit according to claim 18, wherein the controller is an electrical controller unit for supporting at least one of manual, semi-automated and fully automated operation of the failsafe support.

32. A kit according to claim 18, wherein the controller comprises an interface for coupling the failsafe support to an exiting bridge controller unit.

* * * * *